(12) United States Patent
Kurane

(10) Patent No.: US 7,868,938 B2
(45) Date of Patent: Jan. 11, 2011

(54) IMAGE PICKUP DEVICE AND IMAGE PICKUP APPARATUS

(75) Inventor: Haruhisa Kurane, Shiojiri (JP)

(73) Assignee: Seiko Epson Corporation (JP)

( * ) Notice: Subject to any disclaimer, the term of this patent is extended or adjusted under 35 U.S.C. 154(b) by 731 days.

(21) Appl. No.: 11/747,408

(22) Filed: May 11, 2007

(65) Prior Publication Data

US 2007/0268396 A1 Nov. 22, 2007

(30) Foreign Application Priority Data

May 11, 2006 (JP) ............................. 2006-132106
Apr. 4, 2007 (JP) ............................. 2007-098182

(51) Int. Cl.
*H04N 5/235* (2006.01)
*H04N 3/14* (2006.01)
*H04N 5/335* (2006.01)
*G03B 7/00* (2006.01)

(52) U.S. Cl. ..................... 348/296; 348/362; 348/230.1
(58) Field of Classification Search ................. 348/296, 348/222.1, 229.1, 230.1, 294, 297, 298, 362, 348/364–367
See application file for complete search history.

(56) References Cited

U.S. PATENT DOCUMENTS 5,455,621 A * 10/1995 Morimura ................. 348/229.1

2008/0316347 A1 * 12/2008 Gamal et al. ................. 348/296

FOREIGN PATENT DOCUMENTS

JP 2004-032583 1/2004

* cited by examiner

*Primary Examiner*—David L Ometz
*Assistant Examiner*—Richard Bemben
(74) *Attorney, Agent, or Firm*—Harness, Dickey & Pierce, P.L.C.

(57) ABSTRACT

An image pickup device having a photoelectric conversion unit having a plurality of photoelectric conversion elements arranged in a matrix pattern for converting exposed light into electric charges and accumulating the same and an electronic shutter function for controlling the exposure time for each frame including: a first reader for reading out electric charges exposed during a standard exposure time from respective pixels including the photoelectric conversion elements in the exposed area of the photoelectric conversion unit in a destructive read-out method; a second reader for reading out electric charges exposed during a short exposure time, which is an exposure time shorter than the standard exposure time, from the respective pixels including the photoelectric conversion elements during the same exposure period as the first reader in a nondestructive read-out method; and a saturation predictor for predicting whether or not the amounts of accumulated electric charges in the respective pixels being exposed during the standard exposure time are saturated on the basis of a non-standard exposure pixel data including the electric charges being exposed during the short exposure time, which are read out by the second reader.

2 Claims, 15 Drawing Sheets

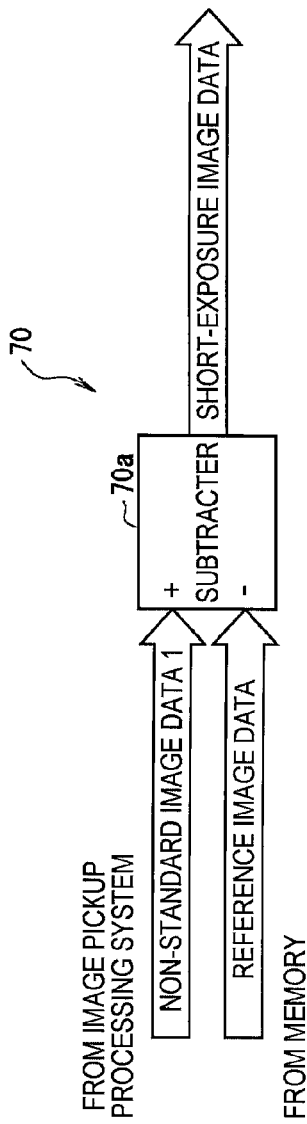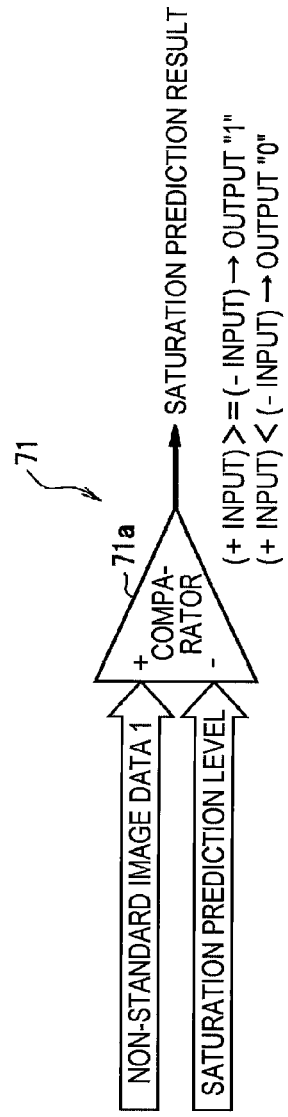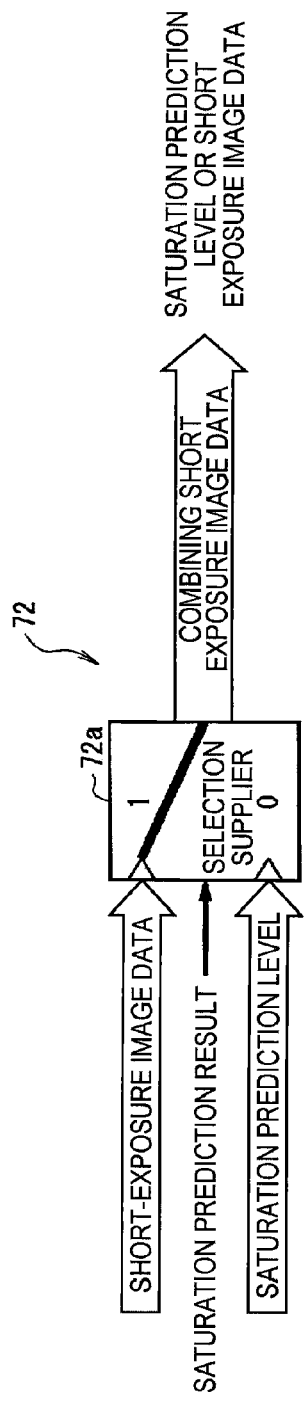

IMAGE PICKUP DEVICE AND IMAGE PICKUP APPARATUS

BACKGROUND

1. Technical Field

The present invention relates to an image pickup device and an image pickup apparatus which can read out electric charges from a photoelectric conversion element in a destructive read-out method and a nondestructive read-out method.

2. Related Art

As one of problems of an image pickup apparatus using a solid-state image pickup device represented by a digital still camera, narrowness of the dynamic range is exemplified. Therefore, an image acquired by photographing a scene having a significantly large contrast includes an over exposure (saturation of pixels) in a high-intensity area and blackened display in a low-intensity area.

A number of methods are proposed in order to solve the above-described problem. As one of these methods, there is a method of combining two (or a plurality of) images having different exposure values. Known examples in which this method is employed include an image pickup apparatus described in JP-A-2004-32583.

The image pickup apparatus in this document is an image pickup apparatus in which standard image signals having adequate exposure values and non-standard image signals having smaller exposure value than the standard image signals are obtained by exposure value variable means which enables photographing with varied exposure values, characterized by means for generating saturation determination signals (mask image signals in the invention) which indicates whether or not the value of the outputted standard image signal exceeds a threshold value (for determining saturation of pixels) and means for switching two image signals on the basis of the saturation determination signal (for replacing the saturated pixels with the standard image signals by values of the nonstandard image signal. Accordingly, images having a wide dynamic range may be acquired.

However, in the related art described in JP-A-2004-32583, when saturation determination signals (saturated pixels are represented by "1", and non-saturated pixels are represented by "0") are generated from the standard image signals having noise added thereto, and the images are combined on the basis of the determination signals, the quality of the combined image may be degraded. More specifically, the image pickup device includes more dark current noise with elapse of time and subjects to more influence of the noise. Variations in sensitivity or saturation from pixel to pixel also result in erroneous determination. For example, as shown in FIG. 15, it occurs because there appear black pixels here and there even though all the pixels are to be originally white pixels due to variations from pixel to pixel. When the images are combined using such saturation determination signals, the standard image signals and the non-standard image signals are mixed falsely (all of them must originally be the non-standard image signals). Although this problem may be solved by changing the threshold value according to variations in characteristics of the respective pixels, a significant labor to set the threshold value for each pixel is required.

On the other hand, there is also a method of acquiring an image having a wide dynamic range by adding the standard image signals and the non-standard image signals (FIG. 16). This simple addition is referred to as Knee system. The Knee system does not include level determination of pixel value, and hence the problem in the related art as in JP-A-2004-32583 does not occur. Since the Knee system includes level compression of a high-intensity area, there arises a problem such that tone reproduction in the high-intensity area is impaired and linearity is disappeared in the device which can display a wide dynamic range (for example, the device which has a capability of contrast display of, for example, 10000:1), so that reproduction of the real colors are not achieved (in the case of a sensor in which a color filter is mounted).

As another problem, when the standard exposed image and the non-standard exposed image are taken at separate timings twice and are combined, a blurred image is resulted.

SUMMARY

An advantage of some aspects of the invention is to provide an image pickup device and an image pickup apparatus which can predict whether or not respective pixels are to be saturated being exposed during a standard exposure time on the basis of pixel data of the respective pixels exposed during an exposure time shorter than the standard exposure time, and an image pickup apparatus which can generate images having a wide dynamic range by combining pixel data exposed for the standard exposure time and pixel data exposed for an exposure time shorter than the standard exposure time on the basis of the prediction result.

Mode 1

There is provided an image pickup device having a photoelectric conversion unit having a plurality of photoelectric conversion elements arranged in a matrix pattern for converting exposed light into electric charges and accumulating the same and an electronic shutter function for controlling the exposure time for each frame including:

a first reader for reading out electric charges exposed during a standard exposure time from respective pixels including the photoelectric conversion elements in the exposed area of the photoelectric conversion unit in a destructive read-out method;

a second reader for reading out electric charges exposed during a short exposure time, which is an exposure time shorter than the standard exposure time, from the respective pixels including the photoelectric conversion elements during the same exposure period as the first reader in a nondestructive read-out method; and a saturation predictor for predicting whether or not the amounts of accumulated electric charges in the respective pixels being exposed during the standard exposure time are saturated on the basis of a non-standard exposure pixel data including the electric charges being exposed during the short exposure time, which are read out by the second reader.

In this configuration, the electric charges exposed during the standard exposure time may be read out from the respective pixels including the photoelectric conversion elements of the photoelectric conversion unit by the first reader through the destructive read-out method, the electric charges exposed during the short exposure time, which is an exposure time shorter than the standard exposure time, may be read out from the respective pixels including the photoelectric conversion elements during the same exposure period as the first reader by the second reader through the nondestructive read-out method, and whether or not the amounts of the accumulated electric charges of the respective pixels being exposed during the standard exposure time are saturated may be predicted on the basis of the non-standard exposure pixel data including the electric charges of the short exposure time read out by the second reader.

Therefore, for example, for a photographic target including a target object and a background thereof, the standard exposure time which achieves an adequate exposure for the target object in the photographic target (standard exposure time) is set to read out the electric charges of the respective pixels in the photoelectric converting unit exposed during the standard exposure time by the first reader. Therefore, the photographic target pixel data exposed during the standard exposure time (standard exposure pixel data) is acquired. On the other hand, since the electric charges of the respective pixels exposed during an exposure time shorter than the standard exposure time (short exposure time) may be read out by the second reader through the nondestructive read-out method during the exposure period during the standard exposure time, the pixel data (non-standard exposure pixel data) having exposed by an amount smaller than the amount of exposure (small signal amplitude) when being exposed during the standard exposure time (signal amplitude) is acquired. In other words, the pixel data being exposed during the standard exposure time (standard exposure pixel data) and the pixel data being exposed during the non standard exposure time (nonstandard exposure pixel data) may be obtained in one exposure operation during the standard exposure time. In addition, it is adapted to predict whether or not the amount of accumulated electric charges of the pixels corresponding to the non-standard exposure pixel data exposed during the standard exposure time on the basis of the read out non-standard exposure pixel data, whether or not the saturation is achieved in a state in which dark current noise is low and the effect of noise is reduced (with the amount of accumulated electric charges during the short exposure time) may be determined. Therefore, there is an advantage such that the variations in the result of determination of saturation/desaturation due to noise are reduced when determining whether or not the amount of the accumulated electric charges in the respective pixels when being exposed during the standard exposure time.

The principle to reduce the variations in the result of determination of the saturation/desaturation will be described below. By intuition, most of the pixel data during the short exposure time becomes a blackened display, and the luminance signals appear only in specific high-intensity areas (areas where the amount of irradiation is large). The wide dynamic range photographing has, for example, a ratio of the light amount of at least 1:500 between the dark area and the bright area. When the exposure time is the same, the ratio of the signal level between the dark area and the bright area is also 1:500, and hence the dark area assumes the black display. As described above, the effect of the noise such as the dark current noise which increases with time is reduced, and hence the erroneous determination is reduced. In addition, the erroneous determination due to the variations in the saturation level and the sensitiveness from pixel to pixel is reduced. In other words, since the determination is performed with the short exposure image, the determination level is reduced, for example, to 1/10 of the saturation level, and hence is less subject to the effect of the variations in the saturation level. As regards the variations in the sensitiveness, since the signal level is determined by the product of the electric charge/voltage conversion gain (sensitiveness) and the light receiving amount, and the determination is performed in a state in which the light receiving amount is low and the signal level is low, the determination is less subject to the effect of the variations in the sensitiveness. As described above, the variations in determination is reduced by detecting (determining) only the area having the signal output when the variations in the pixel characteristics and the effect of the noise is small. Hereinafter, it is the same in the modes relating to the image pickup apparatus, the image pickup system, and the image pickup method.

The term "photoelectric conversion unit" is configured using, for example, CMOS technology. There is, for example, Threshold Voltage Modulation Image Sensor (VMIS) as the image pickup device which is capable of the nondestructive read-out using the CMOS technology. It is the same in the modes relating to the image pickup apparatus, the image pickup system, and the image pickup method.

The term "destructive read-out method" described above is associated with a reset process which empties the electric charges accumulated in the photoelectric conversion elements when reading out the electric charges (pixel signals) from the photoelectric conversion elements. Hereinafer, it is the same in the modes relating to the image pickup apparatus, the image pickup system, and the image pickup method.

The term "nondestructive read-out method" reads out the electric charges (pixel signals) from the photoelectric conversion elements while remaining the accumulated state without emptying the electric charges accumulated in the photoelectric conversion elements. In other words, since the reset process is not performed when reading out the electric charge, the read-out of the electric charges is performed by any number of times for the different exposure times during the accumulation of the electric charges until a preset exposure time is elapsed. It is the same in the modes relating to the image pickup apparatus, the image pickup system, and the image pickup method.

The term "saturation" means a state in which light entering the photoelectric conversion elements exceeds the maximum amount of electric charges that the photoelectric conversion elements can accumulate (hereinafter, referred to as the maximum amount of accumulated electric charges), and the image including the image data of the luminance value at which the saturation is achieved (hereinafter referred to as "saturation value") loose the tones at the corresponding part, and a phenomenon called "over exposure" occurs. For example, when taking a picture of a house with a background of a snow scene, if the picture is taken by adjusting the exposure to the house, which is a target object, most part of the image data in the area of the snow scene assumes the saturation value, and hence the phenomenon of over exposure occurs. Hereinafter, it is the same in the modes relating to the image pickup apparatus, the image pickup system, and the image pickup method.

Mode 2

There is provided an image pickup apparatus having a photoelectric conversion unit having a plurality of photoelectric conversion elements arranged in a matrix pattern for converting exposed light into electric charges and accumulating the same and an electronic shutter function for controlling the exposure time for each frame including:

a first reader for reading out electric charges exposed during a standard exposure time from respective pixels including the photoelectric conversion elements in the exposed area of the photoelectric conversion unit in a destructive read-out method;

a second reader for reading out electric charges exposed during a short exposure time, which is an exposure time shorter than the standard exposure time, from the respective pixels including the photoelectric conversion elements during the same exposure period as the first reader in a nondestructive read-out method;

a saturation predictor for predicting whether or not the amounts of accumulated electric charges in the respective pixels being exposed during the standard exposure time are saturated on the basis of a non-standard exposure pixel data including the electric charges being exposed during the short exposure time, which are read out by the second reader; and an HDR image data generator for generating an HDR (High Dynamic Range) image data by combining a standard exposure pixel data including electric charges being exposed during the standard exposure time read out by the first reader and the non-standard exposure pixel data on the basis of the prediction result of the saturation predictor.

In this configuration, the electric charges exposed during the standard exposure time may be read out from the respective pixels including the photoelectric conversion elements of the photoelectric conversion unit by the first reader through the destructive read-out method, the electric charges exposed during the short exposure time, which is an exposure time shorter than the standard exposure time, may be read out from the respective pixels including the photoelectric conversion elements during the same exposure period as the first reader by the second reader through the nondestructive read-out method, and whether or not the amounts of the accumulated electric charges of the respective pixels being exposed during the standard exposure time are saturated may be predicted on the basis of the non-standard exposure pixel data including the electric charges of the short exposure time read out by the second reader on the basis of the prediction result.

Moreover, with the HDR image data generator, the HDR image data may be generated by combining the standard exposure pixel data including the electric charges being exposed during the standard exposure time read out by the first reader and the non-standard exposure pixel data on the basis of the prediction result of the saturation predictor.

Therefore, for example, for the photographic target including the target object and the background thereof, the standard exposure time which achieves an adequate exposure for the target object in the photographic target (standard exposure time) is set to read out the electric charges of the respective pixels in the photoelectric converting unit exposed during the standard exposure time by the first reader. Therefore, the photographic target pixel data exposed during the standard exposure time (standard exposure pixel data) is acquired. On the other hand, since the electric charges of the respective pixels exposed during an exposure time shorter than the standard exposure time (short exposure time) may be read out by the second reader through the nondestructive read-out method during the exposure period during the standard exposure time, the pixel data (non-standard exposure pixel data) having exposed by an amount smaller than the amount of exposure (small signal amplitude) when being exposed during the standard exposure time (signal amplitude) is acquired. In other words, the pixel data being exposed during the standard exposure time (standard exposure pixel data) and the pixel data being exposed during the non standard exposure time (nonstandard exposure pixel data) may be obtained in one exposure operation during the standard exposure time. Therefore, an image in which blurring is reduced may be generated when combining the two images. Moreover, for example, since an image data (HDR image data) with a wide dynamic range is generated by selecting the non-standard exposure pixel data when it is predicted (determined) to be saturated, selecting the standard exposure pixel data when it is predicted (determined) not to be saturated, and combining the selected non-standard exposure pixel data and the standard exposure pixel data, there is an advantage such that a wide dynamic range image in which the image quality is stabilized in comparison with the related art is acquired.

Mode 3

Preferably, the second reader reads out the electric charges exposed during a plurality of types of the short exposure times shorter than the standard exposure time from the respective pixels including the photoelectric conversion elements in sequence through the nondestructive read-out method during the same exposure period as the first reader, and the saturation predictor predicts whether or not the amount of accumulated electric charges in the respective pixels being exposed during the standard exposure time on the basis of the non-standard exposure pixel data including the electric charges during the plurality of types of the short exposure times read out by the second reader.

In this configuration, for example, when the standard exposure time which achieves an adequate exposure for a target object in a photographic target (standard exposure time) is set for true photographic target including the target object and a background thereof, the electric charges of the respective pixels exposed during the plurality of types of short exposure times (two types, for example) which are shorter than the standard exposure time is read out by the second reader through the nondestructive read-out method during the exposure period during the standard exposure time. Therefore, the pixel data having exposed by a plurality of amounts smaller than the amount of exposure when being exposed during the standard exposure time (non-standard exposure pixel data) is obtained. In addition, it is adapted to predict whether or not the amount of accumulated electric charges of the pixels corresponding to the non-standard exposure pixel data exposed during the standard exposure time on the basis of non-standard exposure pixel data having exposed by a plurality of types of amount. Accordingly, there is an advantage such that whether or not the saturation is achieved in a state in which the effect of noise due to the variations in the respective pixels is small (the amount of accumulated electric charges during the short exposure time). Moreover, when the pixels are not saturated during the short exposure time t2 and are saturated during the short exposure time t1 (t2<t1), an image data (HDR image data) of a wide dynamic range is generated using the non-standard exposure pixel data for the short exposure time t2. Therefore, there is an advantage such that a wide dynamic range image in which more accurate tone expression is achieved.

Mode 4

Preferably, a arithmetic processor for performing a predetermined arithmetic processing for the non-standard exposure pixel data including the electric charges read out by the second reader is provided, the saturation predictor predicts whether or not the luminance value indicated by the standard exposure pixel data becomes the saturation value on the basis of the non-standard exposure pixel data after the arithmetic processing, and the HDR image data generator generates the HDR image data by combining the non-standard exposure pixel data after the arithmetic processing and the standard exposure pixel data on the basis of the prediction result of the saturation predictor.

In this configuration, the predetermined arithmetic processing may be performed for the non-standard exposure pixel data including the electric charges read out by the second reader with the processor, the saturation predictor is capable of predicting whether or not the luminance value indicated by the standard exposure pixel data becomes the saturated value on the basis of the non-standard exposure pixel data after the arithmetic processing, and the HDR image data generator is capable of generating the HDR image data by combining the non-standard exposure pixel data after the arithmetic processing and the standard exposure pixel data on the basis of the prediction result of the saturation predictor.

Therefore, for example, the arithmetic processing suitable for combining the image data such as the luminance level correcting process and the noise eliminating process may be performed for the non-standard exposure pixel data, and in addition, the wide dynamic range image data (HDR image data) may be generated using the non-standard exposure pixel data applied with such arithmetic processing. Therefore, there is an advantage such that the image quality of the wide dynamic range image is improved.

Mode 5

Preferably, a third reader for reading the electric charges immediately after the reset from the respective pixels including the photoelectric conversion elements is provided, and the arithmetic processor performs the arithmetic processing that subtracts reference pixel data including the electric charges immediately after the reset read out by the third reader corresponding to the non-standard exposure pixel data from the non-standard exposure pixel data including the electric charges read out by the second reader.

In this configuration, the electric charges immediately after the reset may be read out from the respective pixels including the photoelectric conversion elements by the third reader, and the arithmetic processor can perform the arithmetic processing that subtracts reference pixel data including the electric charges immediately after the reset read out by the third reader corresponding to the non-standard exposure pixel data from the non-standard exposure pixel data including the electric charges read out by the second reader.

Therefore, since the arithmetic processing for subtracting the luminance value indicated by the pixel data immediately after the reset (operation to empty accumulated electric charges of pixels) from the luminance values indicated by the non-standard exposure pixel data read out by the second reader may be performed, the fixed pattern noise generated by the variations in the individual characteristics of the respective photoelectric conversion elements (pixels) which constitute the photoelectric conversion unit may be eliminated from the non-standard exposure pixel data. In other words, in the nondestructive read-out method, since much noise are mixed to the non-standard exposure pixel data including the read out electric charges, the noise components mixed in the non-standard exposure pixel data may be eliminated by performing the differential arithmetic processing. Therefore, there is an advantage such that the prediction of the saturation/desaturation is achieved on the basis of the non-standard exposure pixel data of a luminance level with higher degree of accuracy. Moreover, since the wide dynamic range image data (HDR image data) may be generated using the non-standard exposure pixel data of the luminance level with a high degree of accuracy, there is an advantage such that the image quality of the wide dynamic range image is improved.

Here, the "fixed pattern noise" includes, for example, those generated by the dark current shading which becomes an issue during the exposure for a long time or the difference in sensitiveness of the sensor from pixel to pixel.

Mode 6

Preferably, the HDR image data generator selects the non-standard exposure pixel data corresponding to the pixels predicted to be saturated by the saturation predictor from the non-standard exposure pixel data read out by the second reader, selects the standard exposure pixel data corresponding to the pixels predicted not to be saturated by the saturation predictor from the standard exposure pixel data read out by the first reader, and combines the selected standard exposure pixel data and the non-standard exposure pixel data to generate the HDR image data.

In this configuration, since the wide dynamic range image data (HDR image data) is generated using the non-standard exposure pixel data without using the standard exposure pixel data which assumes the maximum luminance value when predicted (determined) to be saturated and using the standard exposure pixel data when predicted (determined) not to be saturated, there is an advantage such that the wide dynamic range image in which the image quality is stabilized in comparison with the related art is acquired.

Mode 7

Preferably, the HDR image data generator generates a HDR pixel data corresponding to the selected non-standard exposure pixel data on the basis of the selected non-standard exposure pixel data and the standard exposure pixel data corresponding to the non-standard exposure pixel data when there is no non-standard exposure pixel data exposed for an exposure time shorter than the short exposure time corresponding to the selected non-standard exposure pixel data, generates the HDR pixel data corresponding to the selected non-standard exposure pixel data on the basis of the selected non-standard exposure pixel data, and the non-standard exposure pixel data exposed for the short exposure time and the standard exposure pixel data corresponding to the non-standard exposure pixel data when there is the non-standard exposure pixel data exposed for the exposure time shorter than the short exposure time corresponding to the selected non-standard exposure pixel data, and generates the HDR image data by combining the HDR pixel data and the selected standard exposure pixel data.

For example, when the luminance level of the non-standard exposure pixel data is simply applied with increase correction for generating the image pickup image data using the non-standard exposure pixel data after the increase correction, the noise due to the variations in the pixels is also increased without change by this increase correction. Therefore, a state in which the amplified noise is mixed in the non-standard exposure pixel data after the increase correction may be resulted. Such noise may cause the degradation of the image quality as a matter of course.

In this configuration, when there is not the non-standard exposure pixel data exposed during the exposure time shorter than the short exposure time corresponding to the selected non-standard exposure pixel data, the selected non-standard exposure pixel data and the standard exposure pixel data corresponding thereto may be used in the correction of the luminance level. Therefore, for example, the noise at the time of the increase correction may be reduced by performing the processing to add the non-standard exposure pixel data and the standard exposure pixel data. When there is the non-standard exposure pixel data exposed for the exposure time shorter than the short exposure time corresponding to the selected non-standard exposure pixel data, in the correction of the luminance level, the selected non-standard exposure pixel data, and the non-standard pixel data and the standard exposure pixel data exposed for the short exposure time corresponding thereto may be used. Therefore, for example, by performing the processing for adding the two types data, that is, the non-standard exposure pixel data and the standard exposure pixel data having different exposure times, the noise at the time of the increase correction may be reduced.

Then, since the HDR image data may be generated using the non-standard exposure pixel data with the noise reduced as described above, there is an advantage such that the wide dynamic range image in which the image quality is stabilized in comparison with the related art is acquired.

Mode 8

Preferably, the saturation predictor compares the luminance value indicated by the amount of accumulated electric charges of the respective pixels being exposed during the standard exposure time predicted on the basis of the non-standard exposure pixel data and the luminance value for saturation prediction set for each type of the exposure time and, on the basis of the compared result, predicts whether or not the amounts of accumulated electric charges of the respective pixels being exposed during the standard exposure time, and the HDR image data generator generates the HDR image data by subtracting the result of dividing the first saturation prediction luminance value as the saturation prediction luminance value for the first non-standard exposure pixel data by the first normalization coefficient from the luminance value indicated by the first non-standard exposure pixel data when there is not the second non-standard exposure pixel data as the non-standard exposure pixel data exposed for a short exposure time shorter than the short exposure time corresponding to the first non-standard exposure pixel data as the selected non-standard exposure pixel data, multiplying the result of subtraction by the first normalization coefficient, and adding the standard exposure pixel data corresponding to the first non-standard exposure pixel data to the result of multiplication.

In this configuration, the processing to add the result obtained by multiplying the value obtained by subtracting the first saturation prediction luminance value from the first non-standard exposure pixel data by the first normalization coefficient and the luminance value of the standard exposure pixel data may be performed in the correction of the luminance level of the first non-standard exposure pixel data when there is not the second non-standard exposure pixel data as the non-standard exposure pixel data exposed for a short exposure time shorter than the short exposure time corresponding to the first non-standard exposure pixel data as the selected non-standard exposure pixel data, so that the noise at the time of the increase correction by the adding process is achieved. In other words, the amount of noise amplified at the time of multiplication is reduced in comparison with multiplying the luminance value of the first non-standard exposure pixel data simply by the first normalization coefficient, and the noise can further be reduced for performing the addition process with respect to the standard exposure pixel data.

Since the generation of the HDR image data using such first non-standard exposure pixel data with the noise reduced, there is an advantage such that the wide dynamic range image in which the image quality is stabilized in comparison with the related art is acquired.

The HDR image generation in this mode is different from the Knee system descried above, and is a processing for enlarging the dynamic range while maintaining the linearity of the image signals, whereby the true reproducibility of the color is achieved. It is the same for the image pickup apparatus in Mode 10.

Mode 9

Preferably, when the ratio between the standard exposure time and the short exposure time corresponding to the non-standard exposure pixel data using for generating of the image pickup device is "a:b", the result obtained by dividing the luminance value indicated by the maximum amount of accumulated electric charges which are not saturated by "a/b" is determined to be the saturation prediction luminance value, and the "a/b" is determined to be the normalization coefficient for the non-standard exposure pixel data used for generating the image pickup device.

In this configuration, in the correction of the luminance level of the first non-standard exposure pixel data, the luminance value of the first non-standard exposure pixel data may be multiplied by the first normalization coefficient according to the ratio between the short exposure time and the standard exposure time. Therefore, there is an advantage that the luminance level is corrected more adequately.

Mode 10

Preferably, the HDR image data generator generates the HDR image data by subtracting the result obtained by dividing a second saturation prediction luminance value as the saturation prediction luminance value for the second non-standard exposure pixel data by a second normalization coefficient from the luminance value indicated by the second non-standard exposure pixel data, multiplying the result of subtraction by the second normalization coefficient, adding the result of multiplication and the luminance value indicated by the first non-standard exposure pixel data, subtracting the first saturation prediction luminance value from the result of addition, multiplying the result of subtraction by the first normalization coefficient, and adding the result of multiplication and the luminance value indicated by the standard exposure pixel data corresponding to the first non-standard exposure pixel data, when there is the second non-standard exposure pixel data exposed for an exposure time shorter than the first non-standard exposure pixel data.

In this configuration, when there is the second non-standard exposure pixel data as the non-standard exposure pixel data exposed for the exposure time shorter than the short exposure time corresponding to the first non-standard exposure pixel data as the selected non-standard exposure pixel data, in the correction of the luminance level of the first non-standard exposure pixel data, the process of adding the result obtained by multiplying the value obtained by subtracting the second saturation prediction luminance value from the second non-standard exposure pixel data by the second normalization coefficient and the luminance value indicated by the first standard exposure pixel data, and adding the result of multiplication obtained by multiplying the result of addition by the first normalization coefficient and the luminance value of the standard exposure pixel data may be performed. In other words, the amount of noise amplified at the time of multiplication is reduced more than multiplying the luminance value of the first non-standard exposure pixel data simply by the first normalization coefficient, and the adding process of the second non-standard normalization exposure pixel data and the standard exposure pixel data is also performed. Therefore the noise may further be reduced.

Since the HDR image data may be generated using such first non-standard exposure pixel data with the noise reduced, there is an advantage such that the wide dynamic range image in which the image quality is stabilized in comparison with the related art is acquired.

Mode 11

Preferably, the result obtained by dividing the luminous value indicated by the maximum amount of accumulated electric charges which are not saturated by "a/b" is determined to be the first saturation prediction luminance value when the ratio between the standard exposure time and the short exposure time corresponding to the first non-standard exposure pixel data is "a:b", the result obtained by dividing the luminance value indicated by the maximum amount of accumulated electric charges which are not saturated by "(a·b)/(a·c)" is determined to be the first saturation prediction luminance value when the ratio between the standard exposure time and the short exposure time corresponding to the second non-standard exposure pixel data is "a:c", the "a/b" is determined to be the first normalization coefficient, and the "(a·b)/(a·c)" is determined to the second normalization coefficient.

In this configuration, in the correction of the luminous level of the first non-standard exposure pixel data, the luminous value of the first non-standard exposure pixel data may be multiplied by the first normalization coefficient according to the ratio between the short exposure time and the standard exposure time, and the luminous value of the second non-standard exposure pixel data may be multiplied by the second normalization coefficient according to the ratio between the short exposure time and the standard exposure time. Therefore, there is an advantage such that the correction of the luminous level is performed more suitably.

Mode 12

There is provided an image pickup system having a photoelectric conversion unit having a plurality of photoelectric conversion elements arranged in a matrix pattern for converting exposed light into electric charges and accumulating the same and an electronic shutter function for controlling the exposure time for each frame including:

a first reader for reading out electric charges exposed during a standard exposure time from respective pixels including the photoelectric conversion elements in the exposed area of the photoelectric conversion unit in a destructive read-out method;

a second reader for reading out electric charges exposed during a short exposure time, which is an exposure time shorter than the standard exposure time, from the respective pixels including the photoelectric conversion elements during the same exposure period as the first reader in a nondestructive read-out method;

a saturation predictor for predicting whether or not the amounts of accumulated electric charges in the respective pixels being exposed during the standard exposure time are saturated on the basis of a non-standard exposure pixel data including the electric charges being exposed during the short exposure time, which are read out by the second reader; and an HDR image data generator for generating an HDR (High Dynamic Range) image data by combining a standard exposure pixel data including electric charges being exposed during the standard exposure time read out by the first reader and the non-standard exposure pixel data on the basis of the prediction result of the saturation predictor.

Accordingly, the same effects and advantages as the image pickup apparatus according to Mode 2 will be obtained.

In this case, this system may be implemented as a single apparatus, terminal and other pieces of equipment (in this case, the same as the image pickup apparatus in Mode 2), and may be implemented as a network system having a plurality of the apparatus, terminals and other pieces of equipment communicably connected to each other. In the latter case, the respective components may belong any one of the plurality of pieces of equipment and the like as long as they are communicably connected.

Mode 13

There is provided an image pickup method used in a image pickup apparatus having a photoelectric conversion unit having a plurality of photoelectric conversion elements arranged in a matrix pattern for converting exposed light into electric charges and accumulating the same and an electronic shutter function for controlling the exposure time for each frame including:

first reading step for reading out electric charges exposed during a standard exposure time from respective pixels including the photoelectric conversion elements in the exposed area of the photoelectric conversion unit in a destructive read-out method;

a second reading step for reading out electric charges exposed during a short exposure time, which is an exposure time shorter than the standard exposure time, from the respective pixels including the photoelectric conversion elements during the same exposure period as in the first reading step in a nondestructive read-out method;

a saturation predicting step for predicting whether or not the amounts of accumulated electric charges in the respective pixels being exposed during the standard exposure time are saturated on the basis of the non-standard exposure pixel data including the electric charges being exposed during the short exposure time, which are read out in the second reading step; and an HDR image data generating step for generating an HDR (High Dynamic Range) image data by combining a standard exposure pixel data including electric charges being exposed during the standard exposure time read out in the first reading step and the non-standard exposure pixel data on the basis of the prediction result in the saturation predicting step.

Accordingly, the same effects and advantages as the image pickup device according to Mode 2 will be obtained.

BRIEF DESCRIPTION OF THE DRAWINGS

The invention will be described with reference to the accompanying drawings, wherein like numbers reference like elements.

FIG. 10A is a drawing showing an internal configuration of a first non-standard image generating unit 70.

FIG. 10B is a drawing showing an internal configuration of a first saturation prediction unit 72.

FIG. 10C is a drawing showing an internal configuration of a first combined image generating unit 73.

DESCRIPTION OF EXEMPLARY EMBODIMENTS

First Embodiment

Figure 1:
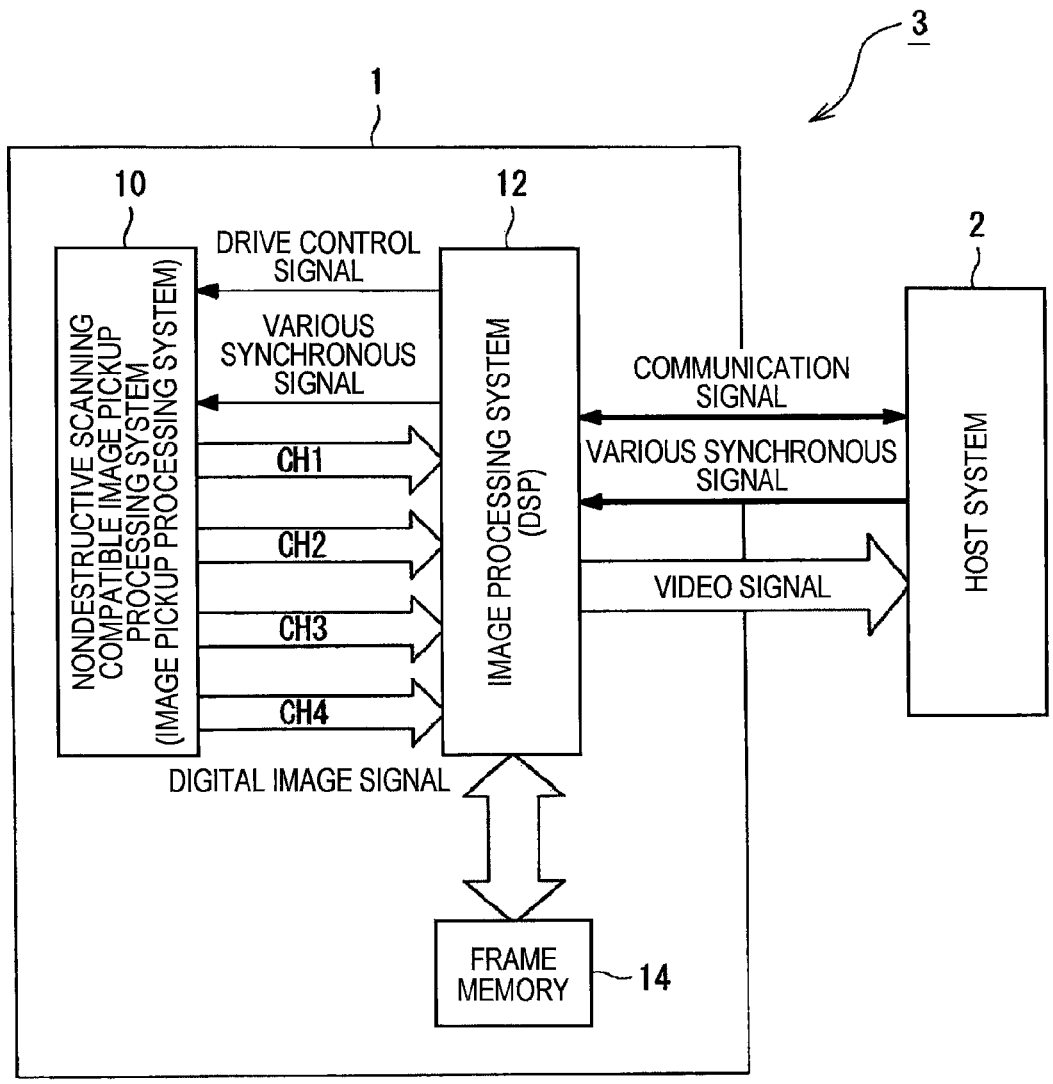
FIG. 1 is a block diagram showing a schematic configuration of an image pickup apparatus 1 according to embodiments of the invention.

Referring now to the drawings, an image pickup device, an image pickup apparatus, an image pickup system, and an image pickup method according to a first embodiment will be described. FIG. 1 to FIG. 13 are drawings showing the image pickup device, the image pickup apparatus, the image pickup system, and the image pickup method according to the embodiments of the invention.

On the basis of FIG. 1, a schematic configuration of an image pickup apparatus 1 according to the embodiment of the invention will be described. FIG. 1 is a block diagram showing a schematic configuration of an image pickup system 3 according to the embodiment of the present invention.

The image pickup system 3 includes the image pickup apparatus 1 and a host system 2 as shown in FIG. 1.

The image pickup apparatus 1 includes a nondestructive scanning compatible image pickup processing system 10 (hereinafter referred to as "image pickup processing system 10") which reads out pixel signals from lines of the respective pixels exposed during the standard exposure time in an exposed area of a sensor cell array 56 (described later) through a destructive read out method in an exposure time (one frame period) which corresponds to a standard exposure time, and reads out pixel signals from lines of the respective pixels exposed in sequence respectively during a short exposure time (an exposure time shorter than the standard exposure time) and a super-short exposure time (an exposure time shorter than the short exposure time) in the exposure area through a nondestructive read out method in the same one frame period, and then outputs pixel data (digital data) of pixel signals in sequence for each read-out pixel line.

Furthermore, as shown in FIG. 1, the image pickup device 1 includes a video processing system (DSP) 12 that generates an image data having a wide dynamic range (hereinafter, referred to as "HDR image data") by predicting whether or not the pixels corresponding to the short exposed pixel data and the super-short exposed pixel data are to be saturated at the exposure time of the standard exposure time on the basis of the image data corresponding to the exposure for the short exposure time (hereinafter, referred to as "short exposure pixel data") and the pixel data corresponding to the exposure for the super-short exposure time (hereinafter, referred to as "super-short exposure pixel data") outputted from the image processing system 10, and combining pixel data corresponding to the exposure for the standard exposure time (hereinafter referred to as the standard exposure pixel data) and the short exposure pixel data and the super-short exposure pixel data on the basis of the predicted result to generates a wide dynamic range image data (hereinafter referred to as HDR image data), and a frame memory 14 for storing various image data such as standard image data (described later), super-short exposure image data including the super-short exposure image data, short exposure image data including the short exposure image data, and the HDR image data.

A host system 2 has a function to provide various control signals and various data to the image pickup apparatus 1 to control the operation thereof and display images of the HDR image data acquired from the image pickup apparatus 1.

Figure 2:
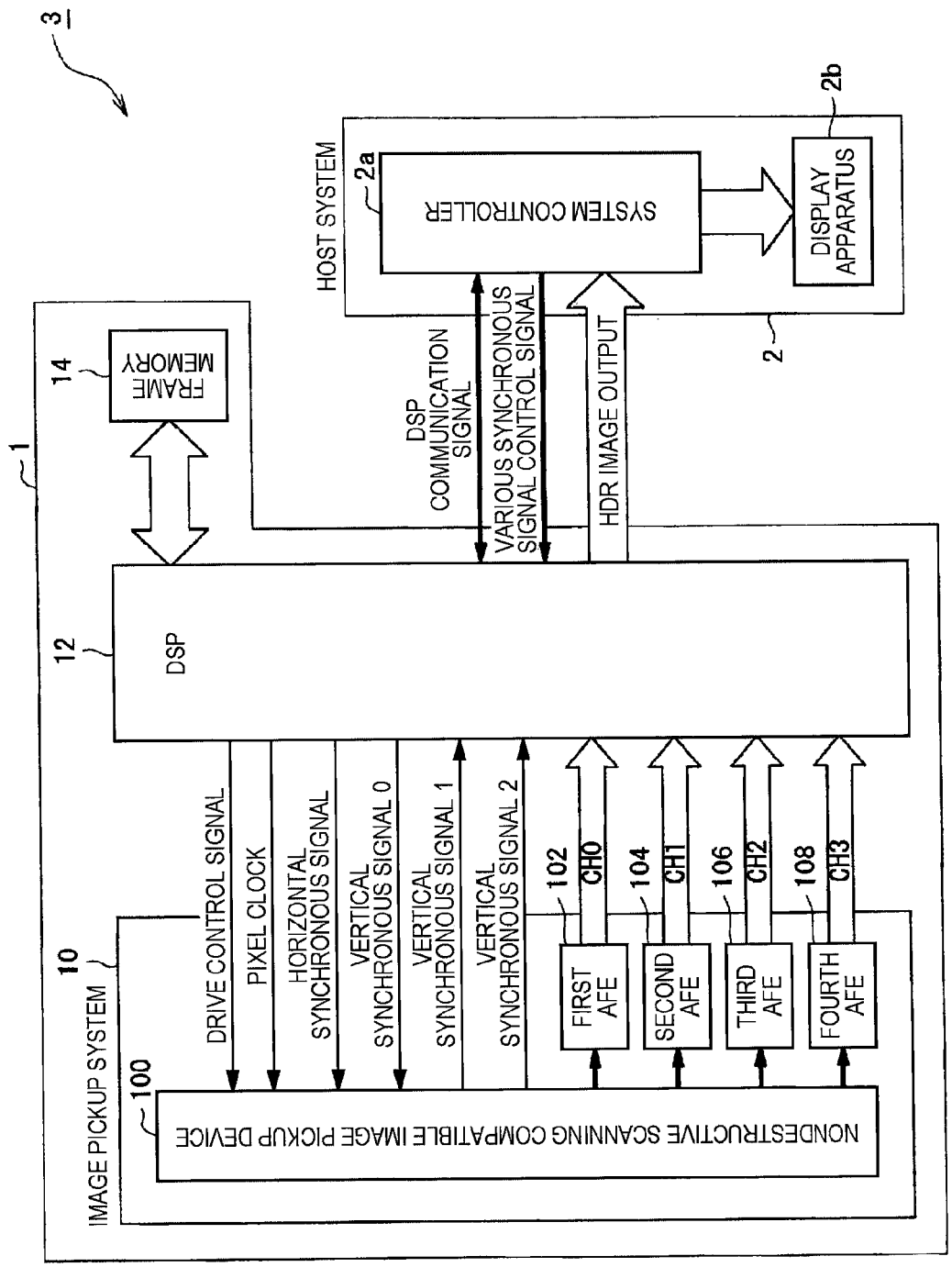
FIG. 2 is a block diagram showing an internal configuration of an image pickup processing system 10 and an internal configuration of a host system 2.
Figure 3:
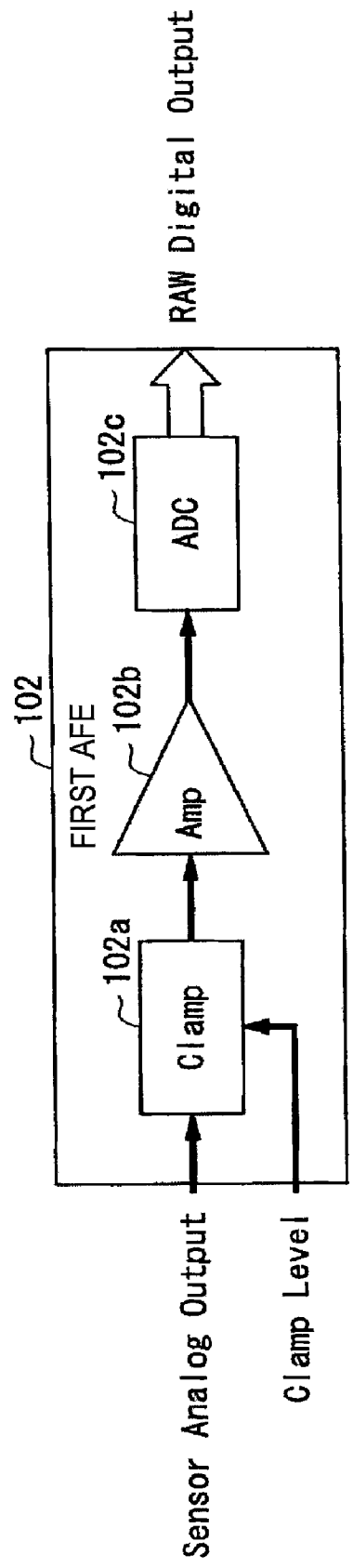
FIG. 3 is a drawing showing an internal configuration of a first AFE (Analog Front End) 102.
Figure 4:
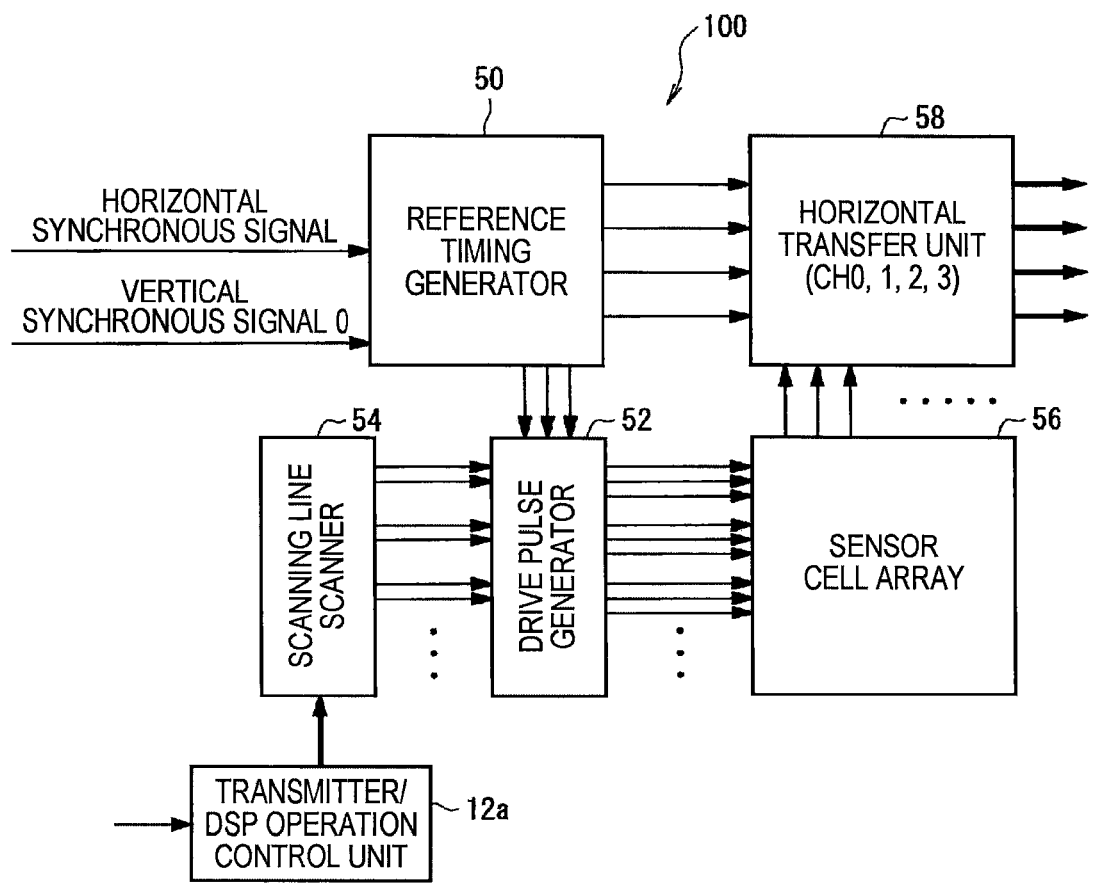
FIG. 4 is a block diagram showing an internal configuration of the nondestructive scanning compatible image pickup device 100.
Figure 5:
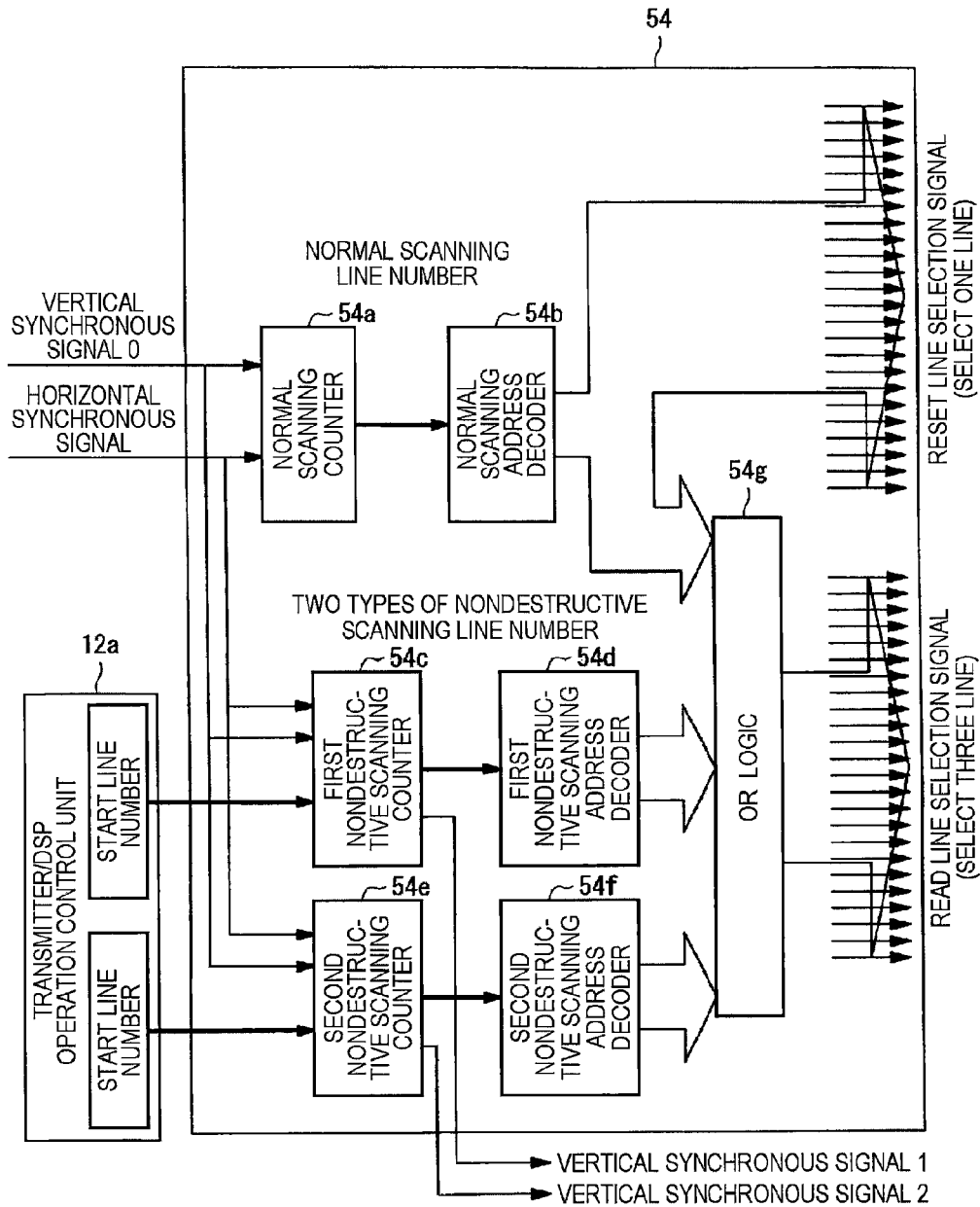
FIG. 5 is a drawing showing an internal configuration of a scanning line scanner 54.
Figure 6:
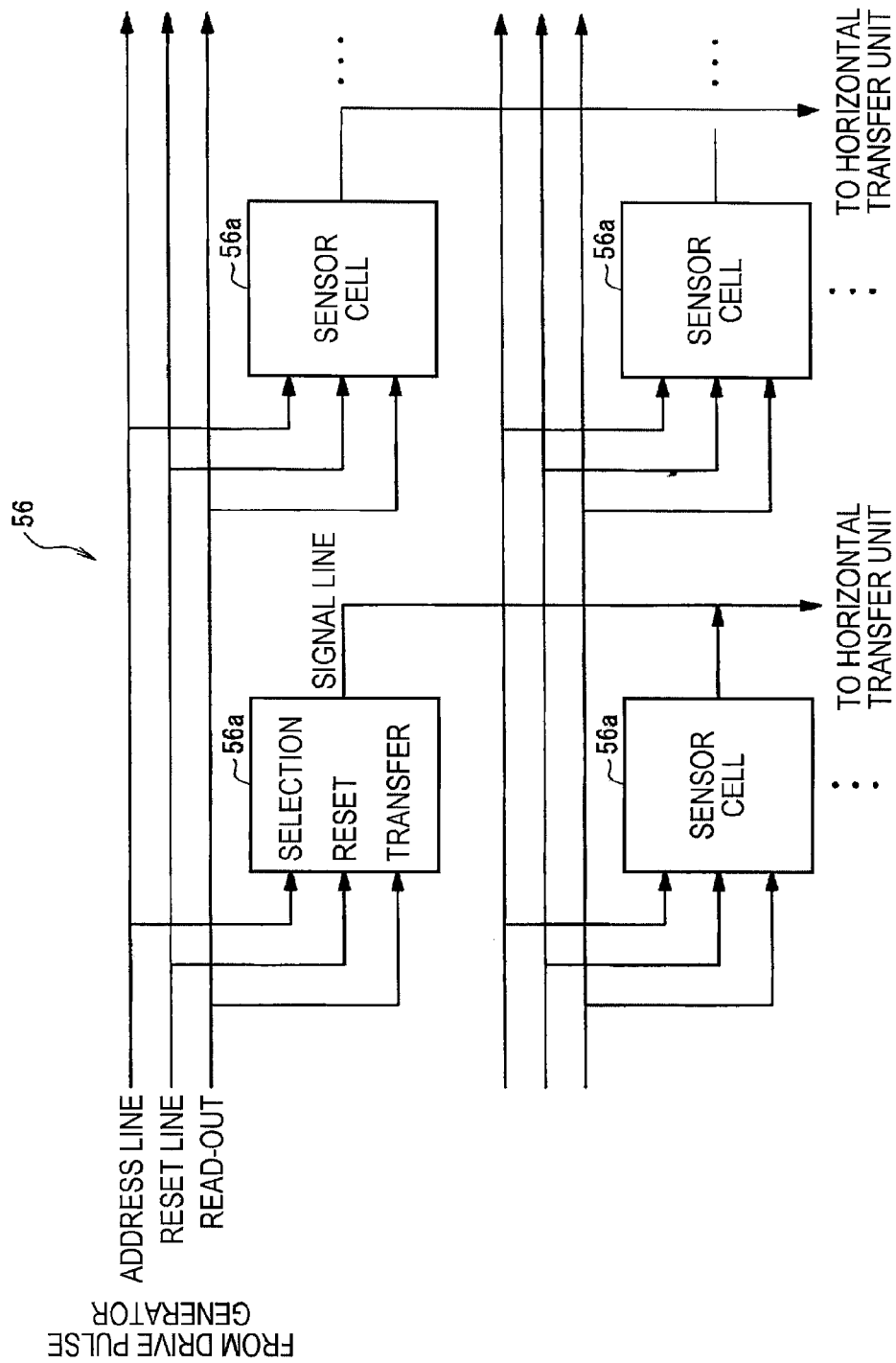
FIG. 6 is a drawing showing a detailed configuration of a sensor cell array 56.

Referring now to FIG. 2 to FIG. 6, an internal configuration of the image pickup processing system 10 will be described. Here, FIG. 2 is a block diagram showing the internal configuration of the image pickup processing system 10 and an internal configuration of the host system 2. FIG. 3 is a drawing showing an internal configuration of a first AFE (Analog Front End) 102. FIG. 4 is a block diagram showing an internal configuration of a nondestructive scanning compatible image pickup device 10. FIG. 5 is a drawing showing an internal configuration of a scanning line scanner 54. FIG. 6 is a drawing showing a detailed configuration of a sensor cell array 56.

As shown in FIG. 2, the image pickup processing system 10 includes the nondestructive scanning compatible image pickup device 100, the first AFE 102, a second AFE 104, a third AFE 106, and a fourth AFE 108.

The nondestructive scanning compatible image pickup device 100 (hereinafter, referred to as "image pickup device 100") collects light from a photographic target in the sensor cell array 56 (described later) by an image pickup lens (not shown) and accumulates electric charges to respective pixels of the sensor cell array 56 according to the amount of collected light. The image pickup device 100 converts electric charge group accumulated through the exposure during the standard exposure time in the respective pixel rows of the sensor cell array 56 into the voltage group in sequence and converts the electric charge group of the respective pixel rows immediately after reset into the voltage group in sequence on the basis of the drive signals (pixel clock, horizontal synchronous signal and vertical synchronous signal 0) outputted from a timing controller 12b (described later) of the video processing system 12. The image pickup device 100 converts the electric charge group accumulated through the exposure during the super-short exposure time in the respective pixel rows of the sensor cell array 56 into the voltage group in sequence on the basis of vertical synchronous signals 1 generated by the scanning line scanner 54 described later, and converts the electric charge group accumulated through the exposure during the short exposure time in the respective pixel rows of the sensor cell array 56 into the voltage group in sequence on the basis of the vertical synchronous signals 2 generated by the scanning line scanner 54 described later. The image pickup device 100 is capable of controlling pixel signal read-out process by applying drive controlling signal from the host system 2 (described later), and is capable of causing the pixel signal read-out process to be performed with a combining of the standard exposure time and one of the short exposure time and the super-short exposure time in addition to the combining with the exposure time. In other words, the combining of the standard exposure time and the super-short exposure time and the combining of the standard exposure time and the short exposure time may be selected in addition to the above-described combining of the standard exposure time, the super-short exposure time, and the short exposure time.

The image pickup device 100 causes the voltage group (pixel signals) generated by converting the electric charge group exposed during the standard exposure time immediately before reset to be outputted to the first AFE 102 in sequence via a first output channel 58a (hereinafter, referred to as CH1) having a first line memory and being included in a horizontal transfer unit 58 (described later), and the voltage group (pixel signals) generated by converting the electric charge group immediately after the reset to be outputted to the second AFE 102 in sequence via a second output channel 58b (hereinafter, referred to as CH2) having a second line memory and being included in the horizontal transfer unit 58 (described later) The image pickup device 100 causes the voltage group generated by converting the electric charge group exposed in the short exposure time exposed during the short exposure time to be outputted to the third AFE 106 via a third output channel 58c (hereinafter, referred to as CH3) having a third line memory and being included in the horizontal transfer unit 58 (described later), and the voltage group generated by converting the electric charge group exposed in the super-short exposure time to be outputted to the fourth AFE 108 via a fourth output channel 58d (hereinafter referred to as CH4) having a fourth line memory and being included in the horizontal transfer unit 58 (described later).

In the first embodiment, the image pickup device 100 performs the read-out of the electric charges before and after the reset from the respective pixels independently through the destructive read-out method via CH1 and CH2 for the exposed area of the sensor cell array 56, and performs the read-out of the electric charges during the short exposure time and the read-out of the electric charges in the super-short exposure time independently through the nondestructive read-out method via CH3 and CH4, so that the electric charge group being exposed during the standard exposure time, the electric charge group immediately after the reset, and the electric charge group being exposed during the short exposure time and the super-short exposure time are read out independently in a single exposure period (standard exposure time) through an electronic shutter function.

The difference in operation between the destructive read-out and the nondestructive read-out is described now. In the destructive read-out, a reset process (a process to empty the electric charges accumulated in the sensor cells) is performed immediately after the read-out, and then the read-out operation is performed again. The read-out signals (analogue data) before the reset are stored in the first line memory and the read-out signals after the reset are stored in the second line memory. Then, subtraction of the corresponding pixel signals is performed by a differential amplifier 60 (described later) to detect the signal level and remove the noise. In contrast, in the nondestructive read-out, the reset process is not performed after the read-out. The signals (analogue data) after the read-out are stored in the third line memory and the fourth line memory separately. The pixel signals stored respectively in the first to fourth line memories are outputted to the first to fourth AFEs 102 to 108 synchronously with the pixel clock.

The first to fourth AFEs 102 to 108 converts the pixel signals (analogue data) corresponding to the different exposure times outputted via the CH1 to CH4 of the horizontal transfer unit 58 respectively into digital data (hereinafter, referred to as "pixel data"). Then, the first to fourth AFEs 102 to 108 output the generated pixel data respectively to a non-standard image data generating unit/saturation prediction unit 12c (described later) and an HDR image generating unit 12d (described later) of the video processing system 12.

Referring now to FIG. 3, the internal configuration of the first AFE 102 will be described.

The first AFE 102 includes a clamp circuit 102a, an amplifier circuit 102b, and an A/D conversion circuit 102c as shown in FIG. 3.

The clamp circuit 102a receives pixel signals from the image pickup device 100, detects whether the received pixel signals are signals in a light-shielded area and, when it is determined that the signals belong to the light-shielded area, a clamping process is performed for all the input signals so as to make the signal level to the black (reference) level, and then the pixel signals after the clamping process is outputted to the amplifier circuit 102b.

The amplifier circuit 102b amplifies the pixel signals after having applied the clamping process so as to match an input range of the A/D conversion circuit 102c, and outputs the pixel signals after having amplified to the A/D conversion circuit 102c.

The A/D conversion circuit 102c converts the pixel signals (analogue data) from the amplifier circuit 102b into the pixel data (digital data) and outputs the same to the video processing system 12.

Since the first to fourth AFEs 102 to 108 have the same internal configuration, description of an internal configuration for the second to fourth AFEs 104 to 108 will be omitted.

Referring now to FIG. 4, the internal configuration of the image pickup device 100 will be described.

As shown in FIG. 4, the image pickup device 100 includes a reference timing generator 50, a drive pulse generator 52, the scanning line scanner 54, the sensor cell array 56, and the horizontal transfer unit 58.

The reference timing generator 50 generates reference timing signals on the basis of the vertical synchronous signals 0 and the horizontal synchronous signals from the timing controller 12b (described later) of the video processing system 12.

The drive pulse generator 52 generates drive pulses on the basis of the reference timing signal from the reference timing generator 50, and reset line selection signals and read-out line selection signals from the scanning line scanner 54, and supplies the same to the sensor cell array 56.

The scanning line scanner 54 selects the position of the reset line in the exposed area to generate the reset line selection signals on the basis of drive control signals which specify start line numbers from a transmitter/DSP operation control unit 12a (described later) of the video processing system 12, selects the positions of the read-out lines in the exposed area respectively to generate the read-out line selecting signal, and outputs the generated selection signals to the drive pulse generator 52.

The sensor cell array 56 includes pixels respectively configured through CMOS technology, exposes the respective pixels in the exposed area during the standard exposure time on the basis of the drive pulse supplied from the drive pulse generator 52, reads out the electric charges accumulated in the respective pixels by the exposure for each pixel line through the destructive read-out method, and outputs the same to the horizontal transfer unit 58 in sequence. On the other hand, the sensor cell array 56 reads out the electric charges accumulated in the respective pixels by the exposure during the short exposure time and the super-short exposure time for each pixel line and for each type of exposure time through the nondestructive read-out method in sequence, and outputs the read out electric charges to the horizontal transfer unit 58 in sequence in the exposure period of the standard exposure time.

The horizontal transfer unit 58 stores the pixel signal data corresponding to the standard exposure time and the pixel signal data immediately after the reset in the exposed area of the sensor cell array 56 in the first line memory of CH1 and the second line memory N of CH2 for each pixel line respectively, and outputs the stored standard exposure time and the pixel signal data immediately after the reset to the differential amplifier 60 (described later).

The horizontal transfer unit 58 stores the pixel signal data corresponding respectively to the short exposure time and the super-short exposure time in the exposed area of the sensor cell array 56 (or one of them depending on the selected combination) in the third line memory of CH3 and the fourth line memory of CH4 for each pixel line respectively and outputs the stored pixel signal data for the short exposure time and the super-short exposure time respectively to the third AFE 106 and the fourth AFE 108.

Referring now to FIG. 5, the internal configuration of the scanning line scanner 54 will be described.

As shown in FIG. 5, the scanning line scanner 54 includes a normal scanning counter 54*a*, a normal scanning address decoder 54*b*, a first nondestructive scanning counter 54*c*, a first nondestructive scanning address decoder 54*d*, a second nondestructive scanning counter 54*e*, a second nondestructive scanning address decoder 54*f*, and an OR logic 54*g*.

The normal scanning counter 54*a* repeats a count-up operation on the basis of the vertical synchronous signal 0 and the horizontal synchronous signal from the reference timing generator 50. Here, the value of the counter corresponds to the pixel line number of the exposed area, and the line number is outputted to the normal scanning address decoder 54*b*.

The normal scanning address decoder 54*b* enables a line having the line number supplied from the normal scanning counter 54*a* as a "read-out line", and disables other lines. Moreover, the normal scanning address decoder 54*b* outputs the read-out line control signal showing the enabled line position (address) to an OR logic 54*g*, and outputs the read-out line control signals to the drive pulse generator 52 as the reset line selection signals.

The first nondestructive scanning counter 54*c* repeats a count-up operation asynchronously with the normal scanning counter 54*a* on the basis of the information showing the start line number supplied from the transmitter/DSP operation control unit 12*a*. Here, the value of the counter corresponds to the pixel line number of the exposed area, and the line number is outputted to the first nondestructive scanning address decoder 54*d*. The first nondestructive scanning counter 54*c* generates a vertical synchronous signal 1 which is a vertical synchronous signal for nondestructive read-out by the exposure for the short exposure time and outputs the generated vertical synchronous signal 1 to the timing controller 12*b* of the video processing system 12.

The first nondestructive scanning address decoder 54*d* enables a line having the line number supplied from the first nondestructive scanning counter 54*c* as a "read-out line" and disables other lines. Moreover, the first nondestructive scanning address decoder 54*d* outputs a read-out line control signal which indicates the enabled line position (address) to the OR logic 54*g*.

The second nondestructive scanning counter 54*e* has a configuration similar to the first nondestructive scanning counter 54*c*, repeats the count-up operation asynchronously with the normal scanning counter 54*a*, and outputs the line number indicated by the counter to the second nondestructive scanning address decoder 54*f*. The second nondestructive scanning counter 54*e* generates a vertical synchronous signal 2 which is a vertical synchronous signal for the nondestructive read-out by the exposure for the super-short exposure time and outputs the generated vertical synchronous signal 2 to the timing controller 12*b* of the video processing system 12.

The second nondestructive scanning address decoder 54*f* has a configuration similar to the first nondestructive scanning address decoder 54*d*, enables a line having the line number from the second nondestructive scanning counter 54*e* as a "read-out line" and disables other lines. Moreover, the second nondestructive scanning address decoder 54*f* outputs the read-out line control signal showing the enabled line position (address) to the OR logic 54*g*.

The OR logic 54*g* performs OR calculation for each line on the basis of the read-out line control signals from the normal scanning address decoder 54*b* and the read-out line control signals from the first and second nondestructive scanning address decoder 54*d* and 54*f*, and generates final read-out line selection signals for each exposure time in the exposed area. Such generated read-out line selection signals are outputted to the drive pulse generator 52.

Referring now to FIG. 6, the detailed configuration of the sensor cell array 56 will be described.

As shown in FIG. 6, the sensor cell array 56 includes a plurality of sensor cells (pixels) 56*a* configured using CMOS arranged in a matrix pattern, and an address line, a reset line, and a read-out line are commonly connected to the sensor cells 56*a* which constitute the respective pixel rows for each pixel row, and the respective drive signals are transmitted to the sensor cells 56*a* which constitute the respective pixel rows via these three control lines. Then, when the address line and the read-out line are enabled, the accumulated electric charges are transferred to any one of the first to fourth output channels 58*a* to 58*d* via the signal line shown in FIG. 6. In this configuration, the address line enables (selects) the pixel rows to perform the reset operation or the read-out operation and, when causing the respective sensor cells 56*a* in the pixel rows selected by the selection signal to perform the reset operation, a signal which gives an instruction of the reset operation is entered via the reset line, and when causing the pixel signal to be read, a signal to given an instruction of transfer of the accumulated electric charge is entered via the read-out line.

Figure 7:
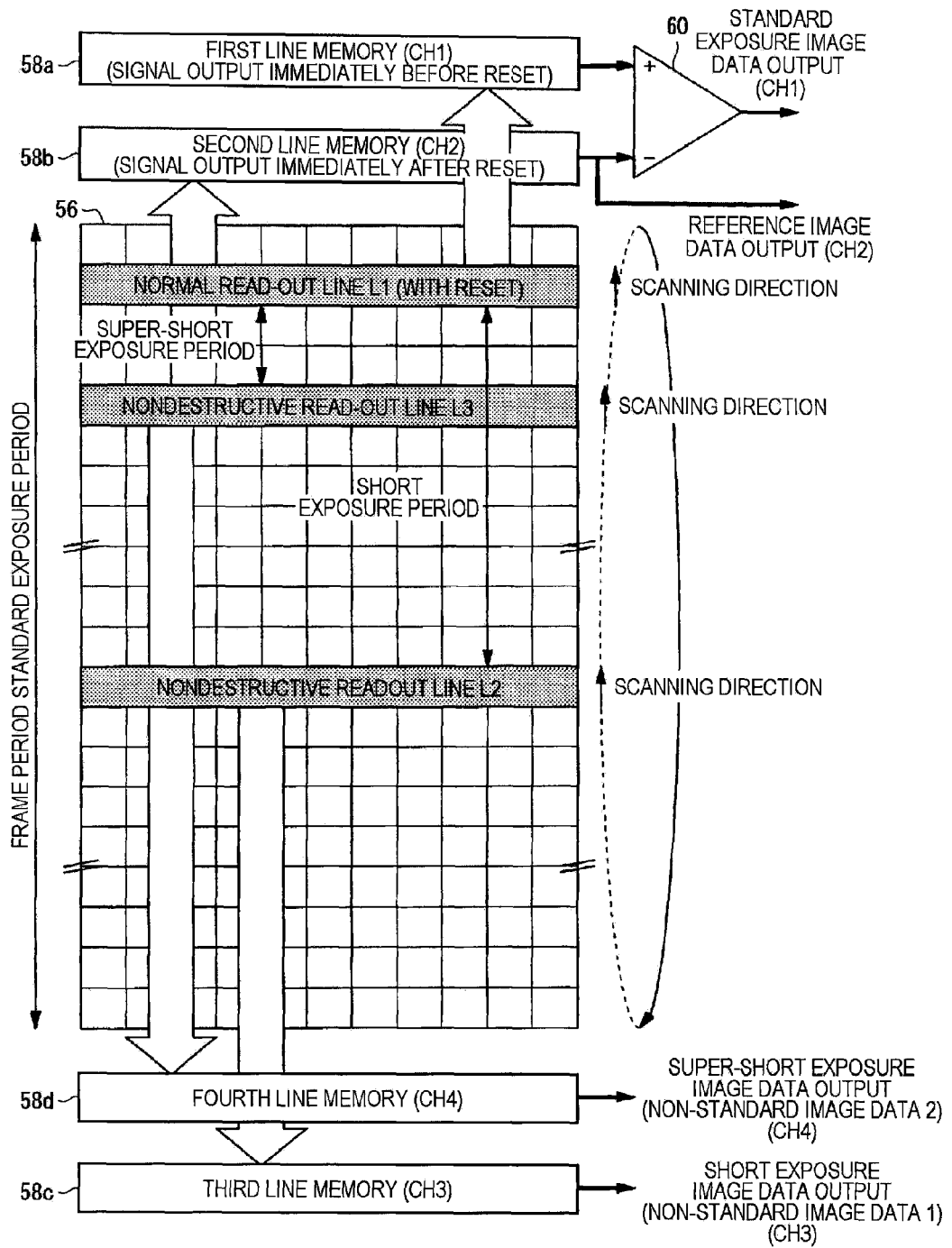
FIG. 7 is a drawing showing an example of operation of exposure and read-out of pixel signals for each pixel line in the sensor cell array 56 of the image pickup device 100.

Referring now to FIG. 7, a method of controlling the exposure time of the image pickup device 100 and a method of reading-out the pixel signal from the sensor cell array 56 will be described. Here, FIG. 7 shows an example of an operation of exposure of the respective pixels for each line and read-out of the pixel signal in the sensor cell array 56 in the image pickup device 100.

Here, the control of the exposure time according to the embodiment of the invention is such that a normal scanning line (read-out line) L1 for performing the reset of the accumulated electric charges of the respective pixel lines and the read-out of the pixel signals in the standard exposure time is set for the exposed area of the sensor cell array 56, and a high-velocity scanning line (read-out line) L2 for performing the nondestructive read-out of the pixel signals in the short exposure time and a high-velocity scanning line (read-out line) L3 for performing the nondestructive read-out of the pixel signals in the super-short exposure time are set for the exposed area of the sensor cell array 56. Then, in the one exposure period (standard exposure time), the read-out and the reset of the pixel signals being exposed during the standard exposure time and the nondestructive read-out of the pixel signals being exposed during the short exposure time and the super-short exposure time are performed independently. In other words, the normal scanning line L1 and the high-velocity scanning lines L2 and L3 are set in such a manner that when the electric charges corresponding to the standard exposure time are accumulated in sequence in the pixel lines in the exposed areas, the normal scanning line L1 reads out the pixel signals of the respective pixel lines in sequence, and resets the accumulated electric charges in sequence as shown in FIG. 7. On the other hand, in the respective pixel lines after the reset of the exposed area, the high-velocity scanning liens L2 and L3 are set respectively so that the pixel signals of the respective pixel lines are read out in sequence nondestructively in the super-short exposure time and the short exposure time during the period in which the electric charges corresponding to the standard exposure time are accumulated.

In the first embodiment, as shown in FIG. 7, the pixel signals (analogue data) being exposure during the standard exposure time are read out to the first line memory of CH1, and on the other hand, the pixel signals immediately after the reset are read out by the second line memory of CH2. Then, the read-out image signals are outputted to the differential amplifier 60 provided on the output side of the horizontal transfer unit 58 as shown in FIG. 7, and a subtraction process between the corresponding pixel signals before and after the reset is performed in the differential amplifier 60 to detect the signal level and eliminate the noise. Then, the pixel signals after the subtraction process are outputted to the first AFE 102, where they are converted into the digital data (pixel data). On the other hand, the pixel signal immediately after the reset which is read out into the second line memory of CH2 is outputted as is to the second AFE, where it is converted into the digital data (pixel data).

The pixel signals being exposed during the short exposure time are read out into the third line memory of CH3 and outputted to the third AFE 106 where the outputted image signals are converted into the digital data (pixel data), while the pixel signals at the time of the exposure during the super-short exposure time are read out into the fourth line memory of CH 4, and outputted to the fourth AFE 108 where the outputted image signals are converted into the digital data (pixel data).

As shown in FIG. 7, control of timing for reading out of the pixel signal of the normal scanning line L1, and the high-velocity scanning lines L2 and L3 is performed in such a manner that the normal scanning line L1 is scanned in sequence for each pixel line (upward in FIG. 7) and, the accumulated electric charges are reset in the normal scanning line L1, and the pixel signals of the pixels exposed for the standard exposure time before and after the reset of the accumulated electric charges and the pixel signal immediately after the reset are read out. Then, for example, the pixel signals are read out and reset in the first line and, when all the pixel signals are read out to the outside from the line memory, the scanning of the normal scanning line L1 is performed in sequence. Then, when the normal scanning line L1 reaches the first line again, the scanning of the normal scanning line L1 is performed at a at the timing when the normal exposure time is just elapsed. In this procedure, the read-out of the pixel signals at the time of normal exposure and the reset of the accumulated electric charges are performed in sequence for each pixel lines for the pixel lines in the exposed area of the sensor cell array 56. On the other hand, when the accumulated electric charges are reset by the normal scanning line L1, the nondestructive read-out of the pixel signals for the pixels exposed for the ultra-short exposure time in the high-velocity scanning line L3 is performed for the pixel lines after the reset, and subsequently, the nondestructive read-out of the pixel signals of the pixels exposed for the short exposure time in the high-velocity scanning line L2 is performed. In this procedure, the nondestructive read-out of the pixel signals being exposed during the super-short exposure time and the short exposure time is performed in sequence for each line for the respective pixel lines of the sensor cell array 56.

Figure 8:
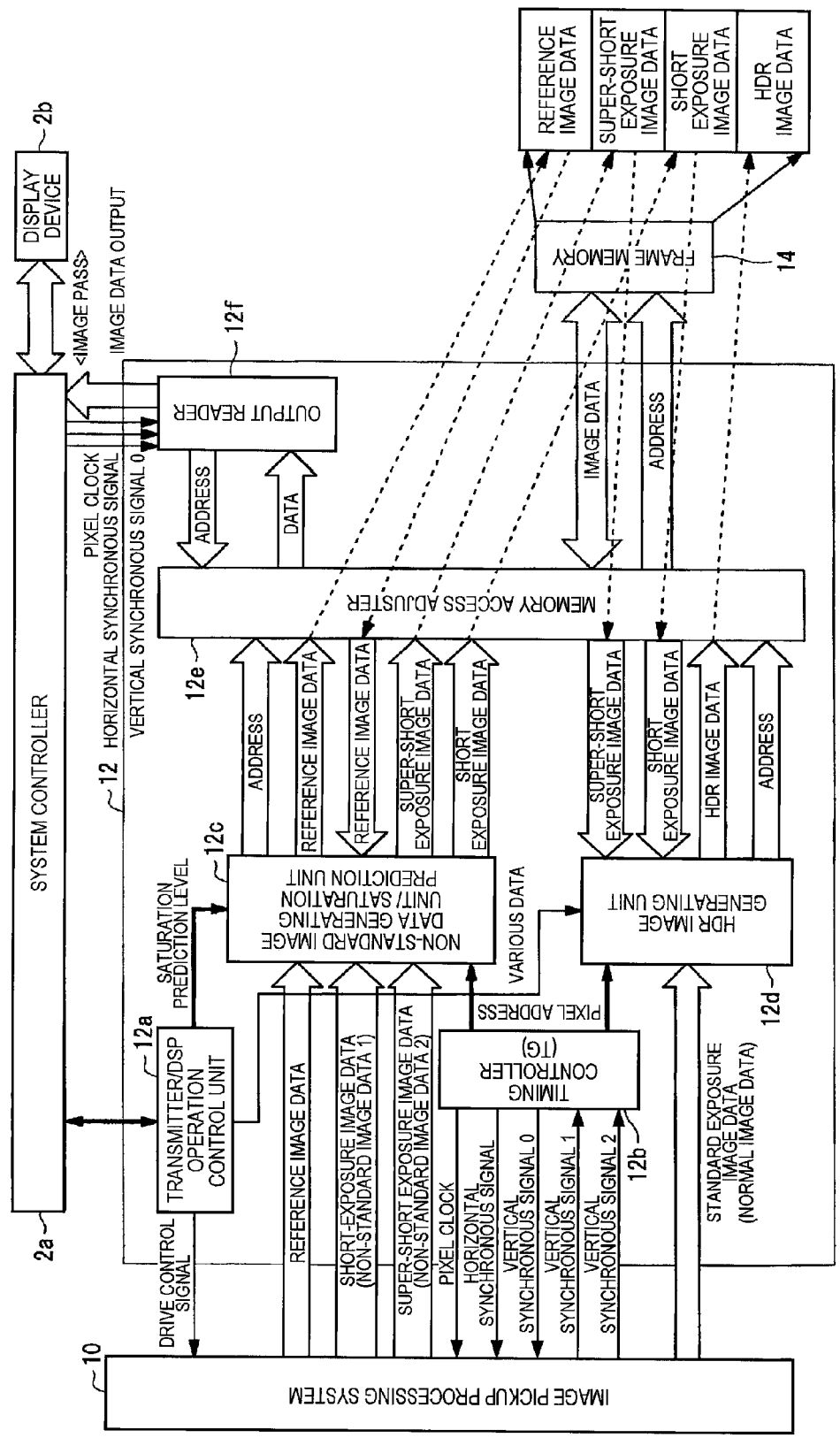
FIG. 8 is a block diagram showing an internal configuration of a video processing system 12.
Figure 9:
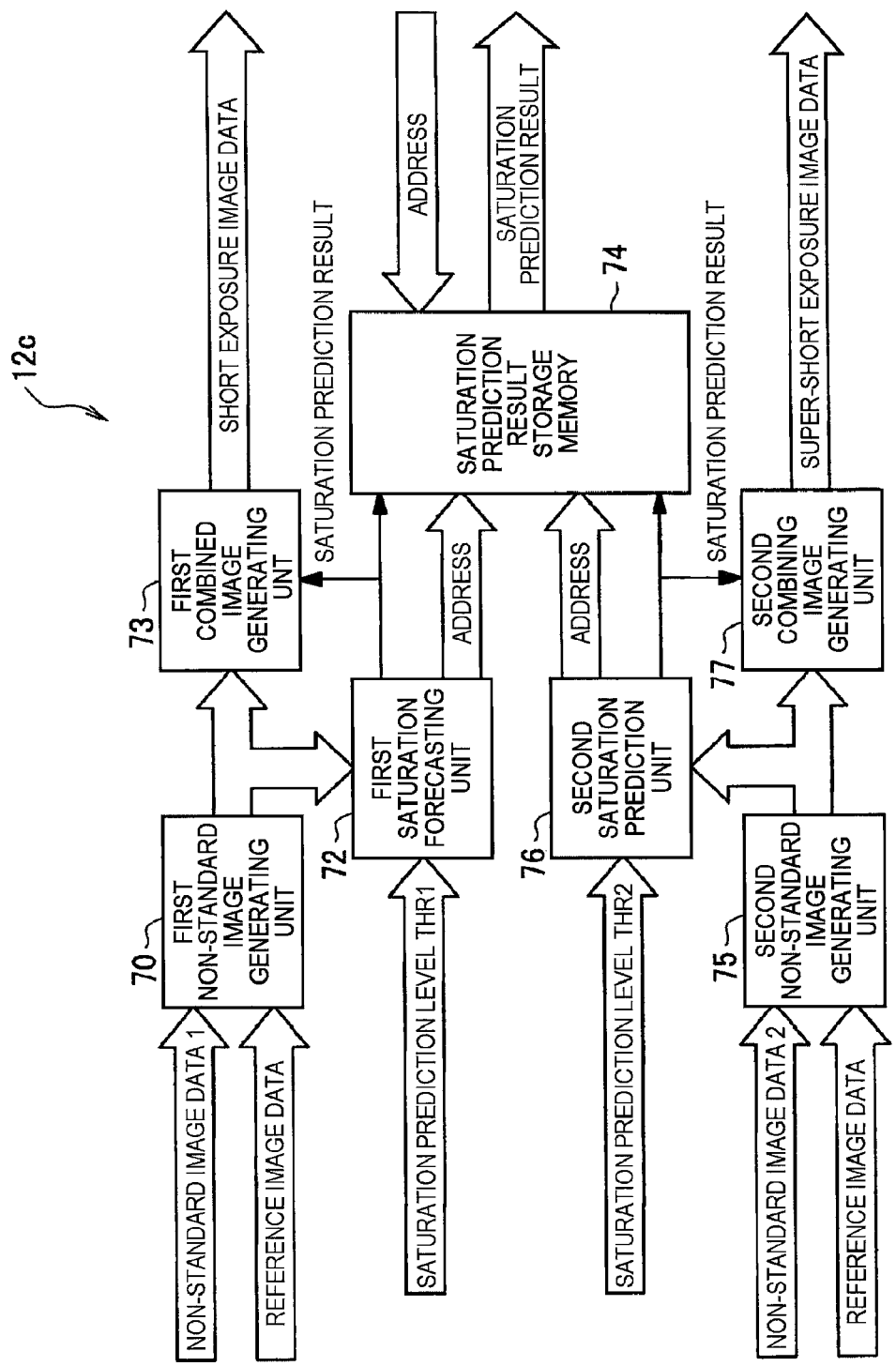
FIG. 9 is a drawing showing an internal configuration of a non-standard image data generating unit/saturation prediction unit 12c.
Figure 11:
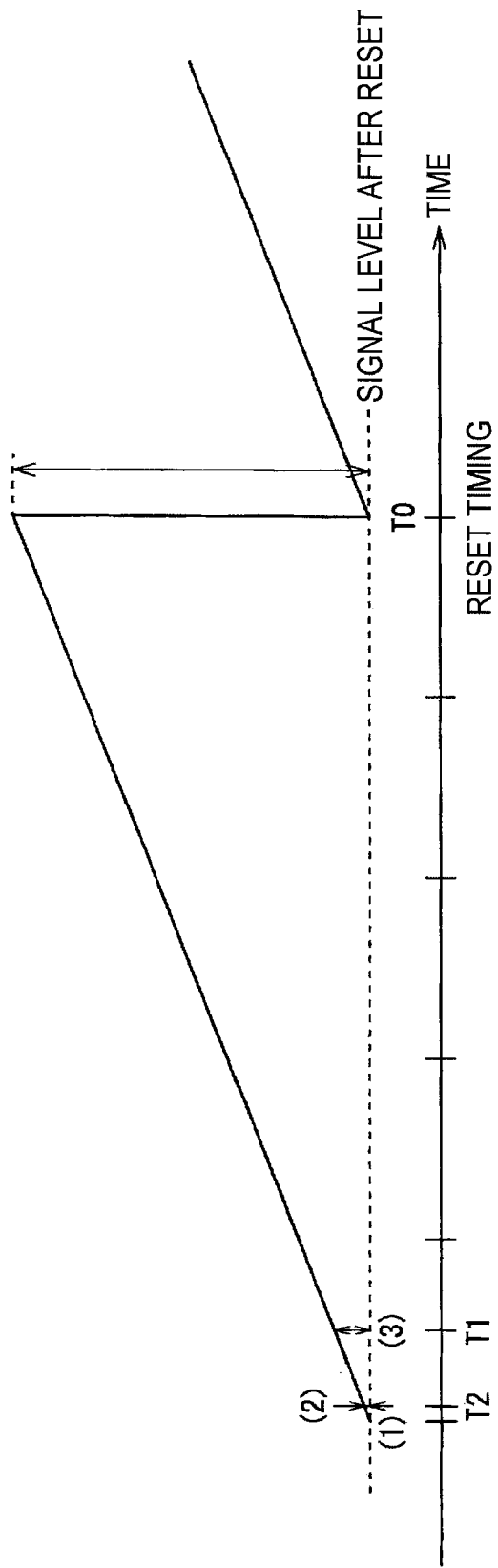
FIG. 11 is a drawing showing transition of the amount of accumulated electric charge of the pixels in a destructive read-out system.
Figure 12:
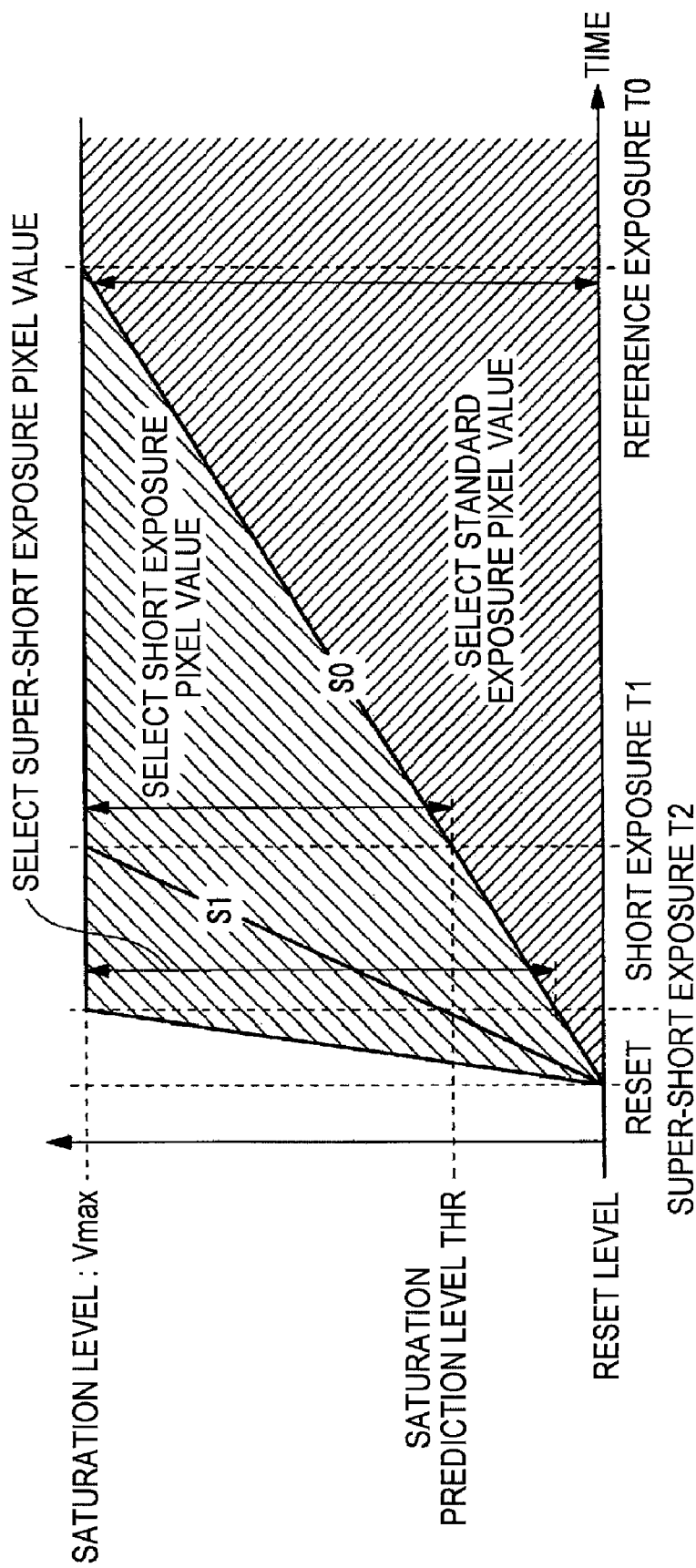
FIG. 12 is a drawing showing an example of the transition of the exposure time and the signal level (luminance level) with respect to the amounts of irradiation different from pixel to pixel in the sensor cell array 56.
Figure 13:
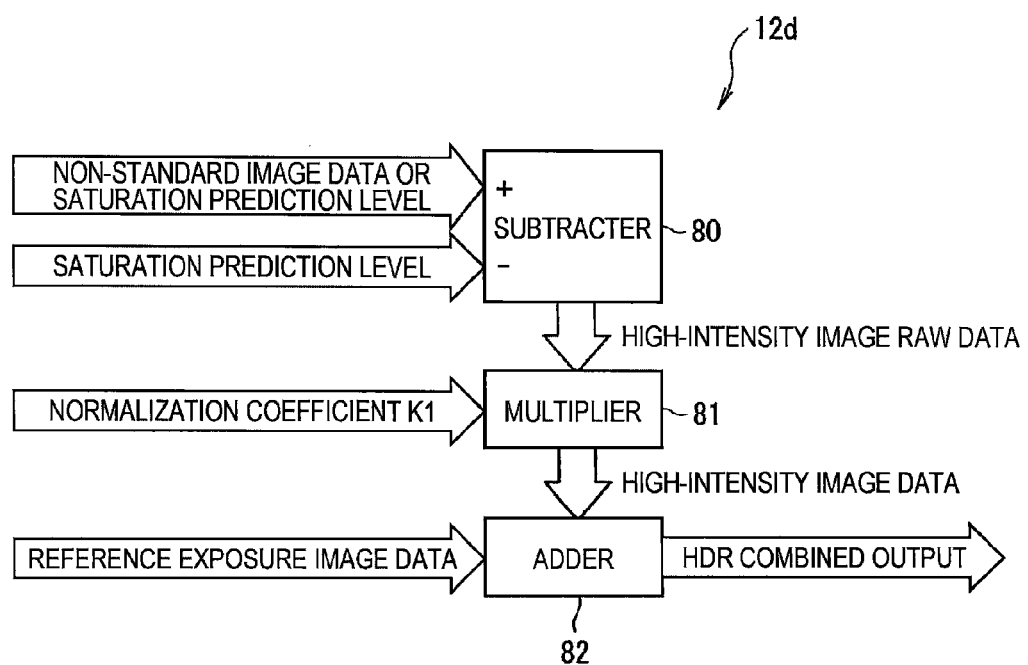
FIG. 13 is a drawing showing an internal configuration of an HDR image generating unit 12d according to the first embodiment.

Referring now to FIG. 8 to FIG. 11, an internal configuration of the video processing system 12 will be described. FIG. 8 is a block diagram showing the internal configuration of the image processing system 12. FIG. 9 is a drawing showing an internal configuration of the non-standard image data generating unit/saturation prediction unit 12c. FIG. 10A is a drawing showing an internal configuration of a first non-standard image generating unit 70, FIG. 10B is a drawing showing an internal configuration of a first saturation predicting unit 72, and FIG. 10C is a drawing showing an internal configuration of a first combined image generating unit 73. FIG. 11 is a drawing showing transition of the amount of accumulated electric charges of the pixels in the nondestructive read-out method. FIG. 12 is a drawing showing an example of transition of the exposure time and the signal level (luminance level) for the different amounts of irradiation of the respective pixels of the sensor cell array 56. FIG. 13 is a drawing showing an internal configuration of the HDR image generating unit 12d in the first embodiment.

The image processing system 12 includes the transmitter/DSP operation control unit 12a, the timing controller 12b, the non-standard image data generating unit/saturation prediction unit 12c, the HDR image generating unit 12d, a memory access adjuster 12e, and an output reader 12f as shown in FIG. 8.

The transmitter/DSP operation control unit 12a obtains information relating to the start line number for the nondestructive read-out of the sensor cell array 56 from a system controller 2a (described later), and outputs drive control signals which indicate the obtained start line number to the scanning line scanner 54 of the image pickup processing system 10.

The timing controller 12b generates the drive signals (pixel clock, horizontal synchronous signal, vertical synchronous signal 0) of the image pickup device 100 and outputs the generated drive signals to the reference timing generator 50 of the image pickup device 100. Since the pixel positions (pixel row (line) number, pixel number) in the sensor cell array 56 of the image pickup device 100 corresponding to the pixel signals of at the time of the exposure in the standard exposure time in the total exposed area outputted from CH1 of the image pickup processing system 10 is known from the horizontal synchronous signal and the vertical synchronous signal 0, the timing controller 12b generates the corresponding pixel row (line) number (hereinafter, referred to as "address information") and outputs the address information to the HDR image generating unit 12d. Since the pixel position in the sensor cell array 56 of the image pickup device 100 corresponding to the pixel signal being exposed during the short exposure time and the super-short exposure time outputted respectively from CH3 and CH4 of the image pickup processing system 10 is known from the vertical synchronous signal 1 and the vertical synchronous signal 2 from the image pickup processing system 10, the timing controller 12b generates the address information and outputs the address information to the non-standard image data generating unit/saturation prediction unit 12c.

The non-standard image data generating unit/saturation prediction unit 12c includes the first non-standard image generating unit 70, the first saturation prediction unit 72, the first combined image generating unit 73, the saturation prediction result storage memory 74, a second non-standard image generating unit 75, a second saturation prediction unit 76, and a second combined image generating unit 77, as shown in FIG. 9.

The first non-standard image generating unit 70 includes a subtracter 70a, as shown in FIG. 10A. Here, pixel data corresponding to the exposure time other than the standard exposure time is referred to as the non-standard exposure pixel data. In other words, the super-short exposure pixel data and the short exposure pixel data corresponding respectively to the super-short exposure time and the short exposure time are the non-standard exposure pixel data.

The subtracter 70a is adapted to subtract the pixel value indicated by the standard pixel data as the pixel data immediately after the reset which is read out from the frame memory 14 via the memory access adjuster 12e at the same pixel position as the respective short exposure pixel data from the respective pixel values indicated by the short exposure pixel data (the short exposure pixel data in line unit) as one of the non-standard exposure pixel data supplied from the image pickup processing system 10. Then, the first non-standard image generating unit 70 outputs the short exposure image data including the differential values to the first saturation predicting unit 72 and the first combined image generating unit 73, respectively.

Here, the non-standard image data generating unit/saturation prediction unit 12c stores the standard pixel data supplied from the image pickup processing system 10 in the frame memory 14 via the memory access adjuster 12e on the basis of the address information supplied from the timing controller 12b, and from then on, reads out the stored standard pixel data for use. Therefore, the standard image data must simply be acquired first one time (standard exposure period).

For explaining the operation of the first non-standard image generating unit 70, transition of the amount of accumulated electric charges in the respective pixels of the sensor cell array 56 on the basis of FIG. 11.

As shown in FIG. 11, in the exposure of the one frame (standard exposure time), the amounts of accumulated electric charges in the respective pixels of the sensor cell array 56 increase with elapse of time. Since the electric charges are read out from the respective pixels in the nondestructive read-out method in the super-short exposure time (T2 in the drawing) and the short exposure time (T1 in the drawing), the amounts of accumulated electric charges of the respective pixels may be maintained irrespective of the number of times of the read-out of the electric charges during the exposure.

The reset timing in FIG. 11 is a timing for emptying the electric charges accumulated in the sensor cell array 56, and this timing determines the standard exposure time. For example, the electric charges are nondestructively read out at timings (1) to (3) shown in FIG. 11, and the image is generated from the difference as described above. In other words, the image is generated from differences between the amount of electric charge immediately after the reset which is read out at the timing (1), and the amounts of electric charges read out respectively at the timings of (2) and (3).

The nondestructively read-out pixel data acquired from the image pickup processing system 10 may include fixed pattern noise caused by variations in the respective pixels mixed therein. Therefore, by calculating the differential value, the fixed pattern noise is eliminated.

Referring back to FIG. 9, the first saturation prediction unit 72 includes a comparator 72a as shown in FIG. 10B.

The comparator 72a compares a luminance value V1 shown by the short exposure pixel data supplied from the first non-standard image generating unit 70 and a saturation prediction level THR1 as the luminance value for predicting the saturation for the short exposure time supplied through the transmitter/DSP operation control unit 12a from the system controller 2a. When the relation V1>THR1 is satisfied, the value "1" is outputted as the saturated prediction result, and when the relation V1≦THR1 is satisfied, the value "0" is outputted as the saturation prediction result. In other words, when the result of saturation prediction result is "1", it means that the amount of accumulated electric charge of the pixels corresponding to the short exposure pixel data is estimated to saturate when the standard exposure time is elapsed, while when the saturation estimation result is "0", it means that the amount of accumulated electric charge of the pixel which corresponds to the short exposure pixel data is predicted not to be saturated at the time elapsed during the standard exposure time. The first saturation prediction unit 72 outputs the saturation prediction result to the first combined image generating unit 73 and outputs the in the saturation prediction result storage memory 74.

Here, for explaining the operation of the first saturation prediction unit 72, the exposure time for the amounts of irradiation different among the respective pixels of the sensor cell array 56 and the transition of the signal level (luminance level) will be described on the basis of FIG. 12.

As shown in FIG. 12, the case in which the amount of accumulated electric charge is increased in an inclination which reaches just a saturation level Vmax (the maximum luminance value before saturation) at T0 assuming that T2 represents the super-short exposure time, T1 represents the short exposure time, and T0 represents the standard exposure time will be discussed. Assuming that S0 represents the amount of irradiation per unit time in this case, whether or not the pixel will be saturated or not at T0 may be predicted if the amounts of irradiation per unit time S2 and S1 are known from the amount of accumulated electric charge in T2 and T1. Here, the saturation level Vmax of the sensor cell array 56 may be predicted in advance, and when the amount of irradiation is constant, there is a correlation (substantially proportional relation) between the exposure time and the output luminance level. In other words, as long as there is no abrupt luminous change on the photographic target, the amount of accumulated electric charge increases substantially linearly (increases with a substantially same amount of increase) in the exposure period in the standard exposure time.

Therefore, when comparing the amount of increase (amount of irradiation) S0 per unit time which reaches Vmax at the time point of T0 and the amounts of irradiation per unit time at the time points of T2 and T1, and if it is S0 or smaller, the corresponding pixel is predicted not to be saturated at the time point of T2. In contrast, when at least one of the amounts of irradiation at the time points of T2 and T1 exceeds S0, it is predicted that the pixel is saturated at the time point of T0. For example, as shown in FIG. 12, when the transition such that the amount of accumulated electric charge reaches Vmax at the time point of T1, since the amounts of irradiation at the time points of T2 and T1 both exceed S0, the first saturation prediction unit 72 predicts that the target pixel will be saturated in the standard exposure time T0. When predicting with both the super-short exposure pixel data and the short exposure pixel data, as shown in FIG. 12, in a case in which the amount of irradiation at T2 exceeds the amount of increase (the amount of irradiation) S1 per unit time in which the amount of accumulated electric charge reaches Vmax at the time of T1, the pixel is predicted to be saturated at the time point of T1. In other words, in a case in which the saturation is achieved during the short exposure time, the HDR pixel data is generated by using the super-short exposure pixel data.

Returning back to FIG. 9, the first combined image generating unit 73 includes a selection output unit 73a as shown in FIG. 10C.

The selection output unit 73a selects one of the short exposure pixel data supplied from the first non-standard image generating unit 70 and the saturation prediction level THR1 supplied from the system controller 2a via the transmitter/DSP operation control unit 12a, and outputs the selected data on the basis of the saturation prediction result supplied from the first saturation prediction unit 72. More specifically, when the saturation prediction result is "1", the short exposure pixel data is outputted, and when the saturated prediction result is "0", the saturation prediction level THR1 is outputted. Then, the first combined image generating unit 73 stores the selected and outputted short exposure pixel data or the saturation prediction level THR1 in the frame memory 14 as the short exposure pixel data for combined output via the memory access adjustor 12e.

The saturation prediction result storage memory 74 is a memory for storing the saturation prediction result supplied from the first saturation prediction unit 72 and the second saturation prediction unit 76. This is provided for absorbing the time (phase) difference when the line number is different when performing the saturation prediction on the basis of the super-short exposure pixel data and the short exposure pixel data. In other words, since the saturation prediction on the basis of the super-short exposure pixel data is performed first, and the saturation prediction on the basis of the short exposure pixel data is performed after a predetermined period of time, the time difference between these saturation predictions is absorbed. More specifically, the saturation prediction on the basis of the super-short exposure pixel data is stored to the saturation prediction result storage memory 74 in addition to the prediction result by the next super-short exposure pixel data (the two prediction results correspond to the final prediction result). However, the saturation prediction result storage memory 74 exhibits a function to absorb the time difference when the combination for reading out three types of exposure times of the standard exposure time, the super-short exposure time, and the short exposure time in the read-out process as described above.

The second non-standard image generating unit 75 has a configuration similar to the first non-standard image generating unit 70 other than the point that the data to be treated is the super-short exposure image data, so that the pixel values indicated by the reference pixel data which is the pixel data immediately after the reset stored in the fame memory 14 at the same pixel position as the respective super-short exposure pixel data are subtracted from the respective pixel data indicated by the respective super-short exposure pixel data configuring the super-short exposure image data (short exposure pixel data of the line unit). The second non-standard image generating unit 75 outputs the super-short exposure image data including the obtained differential value to the second saturation prediction unit 76 and the second combined image generating unit 77, respectively.

The second saturation prediction unit 76 has a configuration similar to the first saturation prediction unit 72, and in the internal comparator 76a, a luminance value V2 indicated by the super-short exposure pixel data supplied from the second non-standard image generating unit 75 and a saturation prediction level THR2 of the super-exposure time supplied from the system controller 2a are compared and, when the relation "V2>THR2" is satisfied, the value "1" is outputted as the saturation prediction result, and when the relation "V2≦THR2" is satisfied, the value "0" is outputted as the saturation prediction result. There are two conceivable patterns of the saturation prediction here; one is a pattern which predicts whether or not the saturation is achieved at T1, and the other one is a pattern to predict whether or not the saturation is achieved at T0 at the time point of T2. In the first embodiment, these two patterns is switched by providing the control signal from the system controller 2a. The second saturation prediction unit 76 outputs selected one of the super-short exposure pixel data and the saturation prediction level THR2 to the second combined image generating unit 77.

The second combined image generating unit 77 has a configuration similar to the first combined image generating unit 73, and in the internal selection output unit 77a, if the saturation prediction result is "1" and the super short exposure pixel data is outputted on the basis of the saturation prediction result supplied from the second saturation prediction unit 76, if the saturation prediction result is "0", the saturation prediction level THR2 is outputted. Then, the second combined image generating unit 77 stores the selected and outputted one of the super-short exposure pixel data and the saturation prediction level THR2 into the frame memory 14 via the memory access adjuster 12e as the super-short exposure pixel data for combined output.

Referring now to FIG. 13, the internal configuration of the HDR image generating unit 12d will be described.

Here, the principle of the operation of the HDR image generating unit 12d in the first embodiment before explaining the internal configuration will be described.

The above-described short exposure time T1 is 1/K1 of the reference exposure time T0 (T1=T0/K1). In T1, the signal output level of the pixels radiated at S0 is predicted as Vmax/K1 (it is assumed to be THR1 described above). In other words, after having reset, all the pixels are sampled after having elapsed the time T1 (the read-out of the pixel signals is performed from all the pixels), and the pixels whose signal output level exceeds the determination threshold value THR1 are predicted (determined) to be saturated after having elapsed the time T0. The pixels equal to or lower than THR1 are predicted (determined) not to be saturated (desaturated) after having elapsed the time T0.

On the basis of the description described above, a method of generating HDR images according to the first embodiment will be described.

Here, in the first embodiment, in the image pickup processing system 10, only the short exposure pixel data exposed during the short exposure time will be acquired as the non-standard exposure pixel data. In the first embodiment, on the condition of the display device which outputs in a wide dynamic range, the HDR image is generated by linear combining which is achieved by normalization of the exposure time and, more specifically, by normalization of the standard exposure time T0. Therefore, the standard exposure pixel data is used when it is predicted that the value of the standard exposure pixel data in T0 is desaturated, and data obtained by normalizing the short exposure pixel data obtained in T1 is used for obtaining a combined output in other cases.

More specifically, the value of the short exposure pixel data obtained when the exposure time is elongated virtually to T0 is predicted, and the short exposure pixel data is corrected to the predicted value for use. In other words, the standard exposure pixel data which is desaturated at the time of T0 and the short exposure pixel data after correction of luminance at the time of saturation at T0 are combined to generate the HDR image data. In the first embodiment, the short exposure pixel data after correction may be treated as a simple linear combining ($K1 \times V1$). However, in order to reduce variations in determination due to the noise, combining with an idea of Knee system incorporated to the normal linear combining is performed. In other words, linear combining using the value V1 of the short exposure pixel image data at T1 and the value V0 of the normal exposure pixel data at T0 is carried out in accordance with the following expression (1).

$$\text{Combined output} = K1 \times V1 \quad (1)$$
$$= K1 \times (V1 - V\max/K1 + V\max/K1)$$
$$= K1 \times (V1 - V\max/K1) + V\max$$
$$= K1 \times (V1 - THR1) + (\text{signal output at } T0)$$

In the expression (1), the ratio (normalization coefficient) between the normal exposure time T0 and the short exposure time T1 is K1(=T0/T1)

In keeping with description above, the internal configuration of the HDR image generating unit 12d will be described.

As shown in FIG. 13, HDR image generating unit 12d includes a subtracter 80, a multiplier 81, and an adder 82.

The subtracter 80 reads out the short exposure image data for combining from the frame memory 14 via the memory access adjustor 12e, subtracts the saturation prediction level (THR1) supplied via the transmitter/DSP operation control unit 12a from the system controller 2a from the respective short exposure pixel data (V1) or the saturation prediction level (THR1) which constitutes the short exposure image data, and outputs the result of subtraction to the multiplier 81. In other words, since the short exposure pixel data is supplied in the case of the pixel which is predicted to be saturated in the standard exposure time T0, the value of (V1−THR1) in the expression (2) is a value other than "0", and in the case of the pixel which is predicted not to be saturated in the standard exposure time T0, since the saturation prediction level (THR1) is input as V1, the value of (V1−THR1) in the expression (1) is "0".

The multiplier 81 multiplies a normalization coefficient K1 supplied from the system controller 2a via the transmitter/DSP operation control unit 12a, and the value of (V1−THR1) supplied from the subtracter 80, and outputs the result of multiplication to the adder 82. At this time, when it is predicted not to be saturated in the standard exposure time T0, the value of (V1−THR1) is "0" as described above, and hence the result of multiplication of the normalization coefficient K1 also becomes "0".

The adder 82 adds the result of multiplication supplied from the multiplier 81 and the standard exposure pixel data corresponding to the result of multiplication which constitutes the standard image data (line unit) supplied from the image pickup processing system 10, and outputs the result of addition as combined output. The HDR image generating unit 12d stores the combined output in the frame memory 14 as the HDR image data via the memory access adjuster 12e.

Returning back to FIG. 8, the memory access adjuster 12e adjusts an access requirement to the image data in the frame memory 14 of three systems consisting of the non-standard image data generating unit/saturation prediction unit 12c, the HDR image generating unit 12d, and the output reader 12f according to the reading/writing command with respect to the frame memory 14 from these three systems for accessing.

The output reader 12f reads out the HDR image data in the frame memory 14 via the memory access adjuster 12e synchronously with the output timing signal from the system controller 2a, and outputs the read-out HDR image data to the system controller 2a.

As shown in FIG. 8, the frame memory 14 is a memory for storing various image data including reference image data, super-short exposure image data, short exposure image data, and HDR image data. When a read-out request is issued from the memory access adjuster 12e, the frame memory 14 causes the pixel data that is indicated by the request to be read out. When a writing request is issued from the memory access adjuster 12e, the frame memory 14 causes the pixel data that is indicated by the writing request to be written.

Returning back to FIG. 2, the internal configuration of the host system 2 will be described.

The host system 2 includes the system controller 2a and a display device 2b.

The system controller 2a acquires the HDR image data from the video processing system (DSP) 12, displays wide dynamic range images on the display device 2b on the basis of the acquired HDR image data, and applies various control signals and various data to the image pickup device 1 to control the operation thereof.

The display device 2b includes a display device such as a liquid display and has a function that displays the wide dynamic range images. Then, the display device 2b displays images of the HDR image data acquired from the video processing system 12 according to the instruction from the system controller 2a.

Subsequently, the actual operation in the first embodiment will be described.

The operation in a case in which only the read-out of the short exposure pixel data is performed as the non-exposure pixel data will be described below. In the first embodiment, a sampling time (short exposure time) in the nondestructive read-out is assumed to be 1/10 of the normal exposure time.

When the image pickup device 1 is turned on and acquires information on the exposure time from the host system 2 and information on the start line number for the nondestructive read-out through the video processing system 12, the drive control signal for specifying the start line number of the nondestructive read-out is transmitted to the image pickup processing system 10 by the transmitter/DSP operation control unit 12a. In addition, the image pickup device 1 outputs the drive signal (pixel clock, vertical synchronous signal 0, and horizontal synchronous signal) to the image pickup processing system 10 for driving the image pickup device 100, so that the pixel signals of the standard exposure time for the exposed area is obtained in the timing controller 12b.

Upon reception of the drive control signal, the image pickup processing system 10 generates a reset line selection signal synchronously with the vertical synchronous signal 0 and the horizontal synchronous signal, and a read-out line control signal for the destructive read-out during the standard exposure time in the scanning line scanner 54. The image pickup processing system 10 also generates a read-out line control signal for the nondestructive read-out during the short exposure time on the basis of the start line number and the horizontal synchronous signal. In addition, the generated read-out control signal is supplied to the OR logic 54g, and generates the read-out line selection signals for the respective exposure times. Then, the generated reset line selection signal and read-out line selection signal (two types) are outputted to the drive pulse generator 52. The drive pulse generator 52 generates drive pulses on the basis of the reference timing signal from the reference timing generator 50 and the various selection signals from the scanning line scanner 54, and supplies these pulses to the sensor cell array 56.

The sensor cell array 56 performs the destructive read-out of the electric charges accumulated through the exposure for the standard exposure time from the respective pixel lines in the exposed area by scanning the normal scanning line L1 and the high-velocity scanning line L2 on the basis of the drive pulses from the drive pulse generator 52 (the accumulated electric charges are reset after the read-out), and performs the nondestructive read-out of the electric charges accumulated through the exposure for the short exposure time from the respective pixel lines in the exposed area (the accumulated electric charges are not reset after the read-out) independently of the destructive read-out operation. Then the pixel signals before and after the reset configured from the electric charges read out by the scanning of the normal scanning line L1 are outputted to the differential amplifier 60 via CH1 and CH2 of the horizontal transfer unit 58, calculates the differential value therebetween in the differential amplifier 60 and outputs the calculated results to the first AFE 102. The pixel signals immediately after the reset are outputted to the second AFE 104 via CH2 of the horizontal transfer unit 58. On the other hand, the pixel signals including the electric charges read out through the scanning of the high-velocity scanning line L2 are outputted to the third AFE 106 via CH3 of the horizontal transfer unit 58.

The first AFE 102 generates the standard exposure pixel data acquired by converting the pixel signals (analogue data) for the exposure during the standard exposure time outputted in sequence through the differential amplifier 60 into the digital data, and outputs the same to the video processing system 12. On the other hand, the second AFE 104 generates the reference pixel data acquired by converting the pixel signals (analogue data) immediately after the reset outputted in sequence via CH2 into the digital data, and outputs the same to the video processing system 12. The third AFE 106 generates the short exposure pixel data acquired by converting the pixel signals (analogue data) for the exposure during the short exposure time into the digital data, and outputs the same to the video processing system 12.

The video processing system 12 inputs the standard exposure image data outputted from the first AFE 102 to the HDR image generating unit 12d, and inputs the reference image data outputted from the second AFE 104 and the short exposure image data outputted from the third AFE 106 to the non-standard image data generating unit/saturation prediction unit 12c. When the reference image data is supplied from the image pickup processing system 10 and the address information is supplied from the timing controller 12b, the non-standard image data generating unit/saturation prediction unit 12c stores the reference image data in the frame memory 14 via the memory access adjuster 12e on the basis of the address information. When the short exposure image data is supplied continuously from the image pickup processing system 10, the non-standard image data generating unit/saturation prediction unit 12c subtracts the pixel value of the reference pixel data at the same pixel position as the short exposure pixel data, which is stored in the frame memory 14, from the pixel values of the respective short exposure pixel data which constitutes the short exposure image data by the subtracter 70a of the first non-standard image generating unit 70 to generate the short exposure pixel data having the fixed pattern noise eliminated therefrom. When the short exposure image data (line unit) is generated, the first non-standard image generating unit 70 outputs the same respectively to the first saturation prediction unit 72 and the first combined image generating unit 73.

When the short exposure image data is supplied from the first non-standard image generating unit 70 and the saturation prediction level THR1 is supplied from the transmitter/DSP operation control unit 12a, the first saturation prediction unit 72 compares the luminance values V1 indicated by the respective short exposure pixel data which constitute the short exposure image data and THR1 in the comparator 72a. As described above, since the short exposure time T1 is determined to be $1/10$ of the standard exposure time T0, as shown in FIG. 13, the signal output level of the pixel irradiated at S0 described above is predicted to be Vmax/10 in T1. Therefore, here, the normalization coefficient K1 is determined to 10, and the value of THR1 is determined to be "Vmax/10". Therefore, when "V1>Vmax/10" is satisfied, the comparator 72a predicts that the target pixel will be saturated in the standard exposure time and outputs "1" as the saturation prediction result. On the other hand, when "V1≦Vmax/10" is satisfied, the comparator 72a predicts that the target pixel is not saturated during the standard exposure time and outputs "0" as the saturation prediction result. The first saturation prediction unit 72 outputs the saturation prediction result to the first combined image generating unit 73 and outputs the saturation prediction result to the saturation prediction result storage memory 74.

In this manner, since the prediction (determination) of the saturation/desaturation is performed on the basis of the short exposure pixel data, and the short exposure pixel data includes the differential value with respect to the reference pixel data, the prediction (determination) of the saturation/desaturation may be performed on the basis of the pixel data whose noise level to be mixed is low, so that the saturation/desaturation may be predicted (determined) with high degree of accuracy.

When the short exposure image data is supplied from the first non-standard image generating unit 70 and the saturation prediction result is supplied from the first saturation prediction unit 72, the first combined image generating unit 73 selects and output the short exposure pixel data (V1) when the saturation prediction result is "1", and the saturation prediction level THR1 supplied from the system controller 2a through the transmitter/DSP operation control unit 12a when the saturation prediction result is "0", for the respective short exposure pixel data by the selection output unit 73a. The selection output is stored in the frame memory 14 via the memory access adjustor 12e as the short exposure pixel data for combining.

On the other hand, when the short exposure image data is generated, and the standard exposure image data is supplied from the image pickup processing system 10 in the non-standard image data generating unit/saturation prediction unit 12c, the HDR image generating unit 12d generates the HDR image data by the linear combining which is a combination of the normal linear combining and the Knee system.

The HDR image generating unit 12d performs the processing according to the expression (1) using the subtracter 80, the multiplier 81, and the adder 82, and generates the HDR image data.

Here, since the luminance value of the short exposure pixel data (after differential processing)=V1, K1=10, THR1=Vmax/10, and the value of the standard exposure pixel data (signal output in T0)=V0≈Vmax are satisfied, the expression (1) shown above will be the following expression (2):

$$\text{Combined Output} = 10 \times (V1 - V\text{max}/10) + V0 \qquad (2)$$

In other words, the HDR image generating unit 12d reads out the short exposure image data for combining from the frame memory 14 via the memory access adjuster 12e, inputs the read-out data to the subtracter 80, and inputs the saturation prediction level THR1 supplied from the system controller 2a via the transmitter/DSP operation control unit 12a to the subtracter 80. Then, in the subtracter 80, the value of THR1 (Vmax/10) is subtracted from the luminance value V1 or THR1(Vmax/10) indicated by the respective short exposure pixel data which constitutes the supplied short exposure image data, and the result of subtraction is outputted to the multiplier 81. In other words, in the case of the pixels which are saturated during the standard exposure time, the differential value "V1−Vmax/10" between values V1 and VHR1 is outputted, and in the case of the pixels which are not saturated during the standard exposure time, the value "0" is outputted.

The multiplier 81 multiplies the normalization coefficient K1(10) supplied from the system controller 2a through the transmitter/DSP operation control unit 12a and the result of subtraction supplied from the subtracter 80, and the result of multiplication "10×(V1−Vmax/10)" or "0" are outputted to the adder 82.

The adder 82 adds the luminance value V0 indicated by the standard exposure pixel data which constitutes the standard exposure image data supplied from the image pickup processing system 10 and the result of multiplication supplied from the multiplier 81, and outputs the result of addition "10×(V1−Vmax/10)+V0" or "V0" as the HDR combined output. In other words, for pixels which are predicted to be saturated during the standard exposure time T0, the value "10×(V1−Vmax/10)+V0" which is the normalized short exposure pixel data is outputted as the HDR pixel data, while for pixels which are predicted not to be saturated during the standard exposure time T0, the standard exposure pixel data "V0" itself is outputted as the HDR pixel data. In other words, the HDR image data is a combination of the pixel data selected on the basis of the prediction result in which the saturation/desaturation are predicted with high degree of accuracy as described above and obtained by normalizing the short exposure pixel data and the standard exposure pixel data. The HDR image data is stored in the frame memory 14 via the memory access adjuster 12e.

On the other hand, the system controller 2a issues the read-out request of the HDR image data by outputting various synchronous signals to the image pickup device 1.

The output reader 12f reads out the HDR image data stored in the frame memory 14 synchronously with the respective synchronous signals from the system controller 2a via the memory access adjuster 12e, and outputs the read-out HDR image data to the system controller 2a. The system controller 2a acquires the HDR image data outputted from the output reader 12f, and displays the acquired HDR image data on the display device 2b.

In this manner, the image pickup system 3 in the first embodiment is able to pick up images of the target object by the destructive read-out through the exposure during the standard exposure time in one image pickup element (sensor cell array 56), and pick up images of the target object by the nondestructive read-out through the exposure during the short exposure time during the exposure period in this standard exposure time, so that the standard exposure image data used for generation of the HDR image and the non-standard exposure (short exposure) image data used for determination of the saturation/desaturation and generation of the HDR image are acquired simultaneously.

The image pickup system 3 is capable of predicting whether or not the pixels which corresponds to the short exposure image data are saturated during the standard exposure time on the basis of the short exposure image data, so that the saturation/desaturation is determined with high degree of accuracy from the pixel data which is affected little by noise such as dark current noise which increases with time. In comparison with the case of determining saturation by the standard exposure image, erroneous determination is reduced also for the saturation level for each pixel or variation of sensitiveness. In other words, since the determination level is set to a low level when determining by the short exposure image, it is affected rarely by variation of the saturation level or the variation of the sensitiveness. Since the pixel data used for generation of the HDR image data may be selected from either one of the standard exposure pixel data and the short exposure pixel data on the basis of the prediction result, the standard exposure pixel data which is not saturated during the standard exposure time may be selected accurately, whereby the HDR image data in which the image quality is stabilized (with extremely small possibility of erroneous selection) is generated.

Since the image pickup system 3 is capable of combining the short exposure pixel data in the case of saturating in T0 using the standard exposure pixel data and the short exposure pixel data through the method which is a combination of the normal linear combining and the Knee system, the noise component included in the short exposure pixel data for combining (HDR pixel data) in comparison with the normal linear combining is reduced by the integral effect (low-pass filter). Even when there is an erroneous determination, the value of (V1−THR1) of the expression (1) is smaller than the value of the simple V1, and hence the effect applied by multiplied by K1 is reduced.

In the first embodiment, the sensor cell array 56 corresponds to the photoelectric transfer unit according to any one of Modes 1, 2, 12 and 13, the destructive read-out process of the electric charges in the standard exposure time from the exposed area of the sensor cell array 56 by the reference timing generator 50, the scanning line scanner 54, the drive pulse generator 52, and the horizontal transfer unit 58 in the nondestructive scanning compatible image pickup device 100 of the image pickup processing system 10 corresponds to a first reader in any one of Modes 1, 2, 3, 6 and 12 or a first reading step according to Mode 13, and the nondestructive read-out process of the electric charges in the super-short exposure time and the short exposure time from the exposed area of the sensor cell array 56 by the reference timing generator 50, the scanning line scanner 54, the drive pulse generator 52, and the horizontal transfer unit 58 in the nondestructive scanning compatible image pickup device 100 of the image pickup processing system 10 corresponds to the second reader according to any one of Modes 1 to 6 and 12, or a second read-out step in Mode 13.

In the first embodiment, predicting the saturation/desaturation process in the non-standard image data generating unit/saturation prediction unit 12c corresponds to the saturation predictor according to any one of Modes 1, 2, 3, 4, 6 and 12, or a saturation predicting step according to Mode 13, and the HDR image generating unit 12d corresponds to a HDR image data generator according to any one of Mode 2, 4, 6, 7, 8 and 12 and a HDR image data generating step according to Mode 13.

Second Embodiment

Figure 14A:
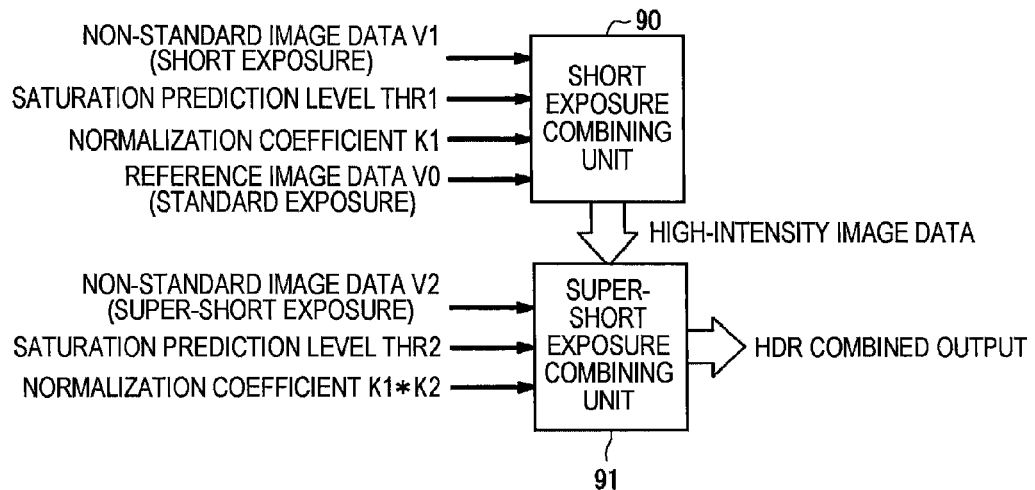
FIG. 14A is a drawing showing the internal configuration of the HDR image generating unit 12d according to the second embodiment.
Figure 14B:
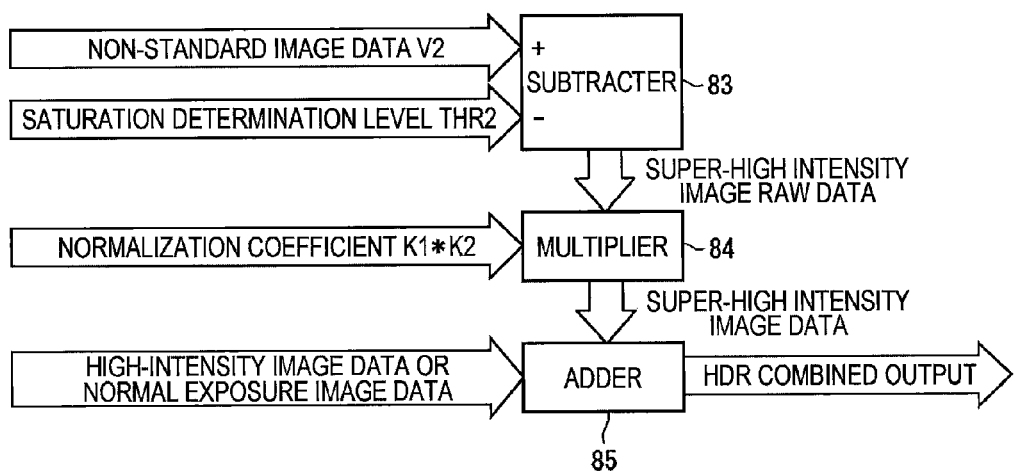
FIG. 14B is a drawing showing the internal configuration of the HDR image generating unit 12d according to the second embodiment.
Figure 15:
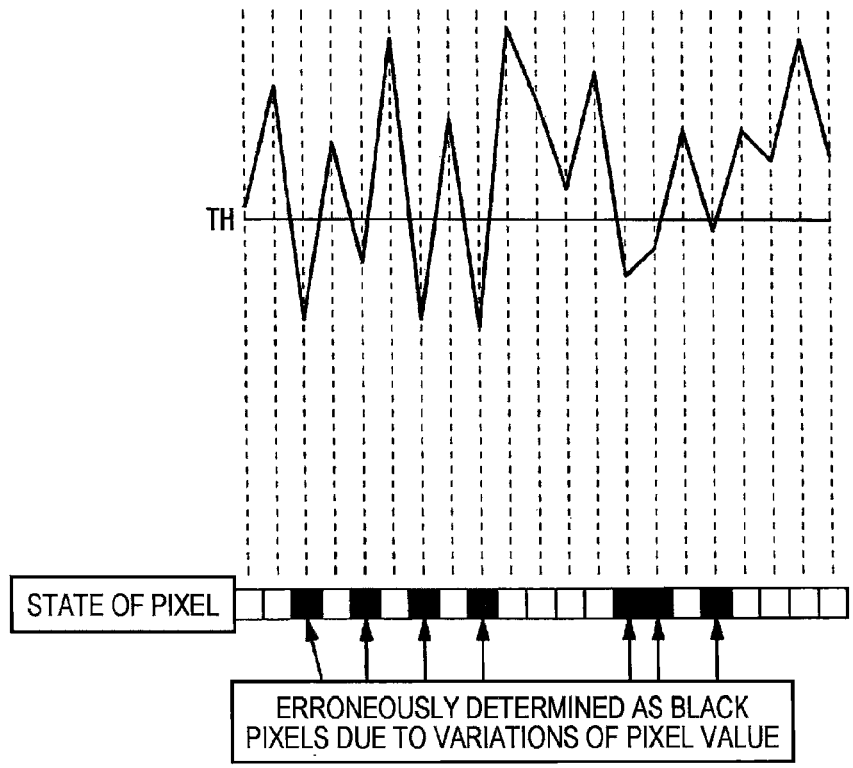
FIG. 15 is a drawing showing an example of erroneous determination of saturation/desaturation through variation in the pixel values in the related art.
Figure 16:
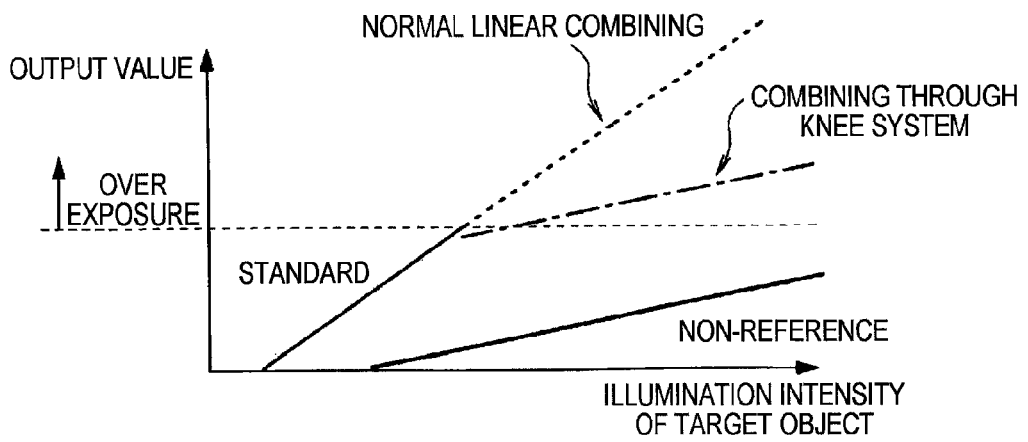
FIG. 16 is a drawing showing the relation between the illumination and the output value of the photographic target in a combining system in the related art.

Referring now to the drawings, the image pickup device, the image pickup apparatus, the image pickup system, and the image pickup method according to a second embodiment of the invention will be described. FIGS. 14A and 14B show the image pickup device, the image pickup apparatus, the image pickup system, and the image pickup method according to the second embodiment of the invention.

The second embodiment is different from the first embodiment in that both of the super-short exposure pixel data and the short exposure pixel data are acquired as the non-standard pixel data and the saturation/desaturation is predicted on the basis of the super-short exposure pixel data and the short exposure pixel data and, when it is predicted that the target pixel will be saturated in the short exposure time T1, the combined output (HDR pixel data) is generated using all of the super-short exposure pixel data, the short exposure pixel data, and the standard exposure pixel data. Therefore, the second embodiment is different only in part of the configuration of the HDR image generating unit 12*d* in FIG. 8 according to the first embodiment, and other configurations and operations are the same as the image pickup system 3 in the first embodiment. Only the part different from the first embodiment will be described.

Referring now to FIGS. 14A and 14B, the internal configuration of the HDR image generating unit 12*d* in the image pickup device 1 according to the second embodiment will be described. Here, FIG. 14A is a block diagram showing an internal configuration of the HDR image generating unit 12*d* in the second embodiment. FIG. 14B is a block diagram showing the internal configuration of a super-short exposure combining unit 91.

Before explaining the internal configuration, the principle of operation of the HDR image generating unit 12*d* in the second embodiment will be described first.

As in the first embodiment, the short exposure time T1 is assumed to be 1/K1 of the standard exposure time T0 (T1=T0/K1), while the super-short exposure time T2 is assumed to be 1/K2 of the short exposure time T1 in the second embodiment. As in the first embodiment, the signal output level in T1 of the pixel being irradiated at S0 is assumed to be Vmax/K1 (THR1), while the signal output level in T2 of the pixel being irradiated at S1 is Vmax/K2 (this is represented as the saturation prediction level THR2 for the super-short exposure time) in the second embodiment. In other words, all the pixels are sampled after having elapsed the time T2 after the reset, and the pixels whose signal output levels exceed the determination threshold value THR2 are predicted to be saturated after having elapsed the time T1. The pixels whose determination threshold value is THR2 or lower are predicted not to be saturated (desaturated) after having elapsed the time T1. On the other hand, as in the first embodiment, all the pixels are sampled after having elapsed the time T1 after the reset, and the pixels whose signal output levels exceed the determination threshold value THR1 are predicted (determined) to be saturated after having elapsed the time T0. The pixels whose determination threshold value is THR1 or lower are predicted (determined) not to be saturated (desaturated) after having elapsed the time T0.

On the basis of the description described above, the method of generation of the HDR image in the second embodiment will be described.

In the second embodiment, it is assumed that the super-short exposure time pixel data and the short exposure time pixel data exposed during the super-short exposure time and the short exposure time will be acquired as the non-standard exposure pixel data in the image pickup processing system 10. In the second embodiment, the exposure time elongated virtually to T0 for the super-short exposure pixel data and the short exposure pixel data is predicted and the super-short exposure pixel data and the short exposure pixel data are corrected to the predicted value for use.

In other words, the standard exposure pixel data when the pixels are desaturated at T0, the super-short exposure pixel data after having corrected the luminance when the pixels are not saturated in T2 but are saturated in T1, and the short exposure pixel data after having corrected the luminance when the pixels are not saturated in T1 and are saturated in T0 are combined to generate the HDR image data. In the second embodiment as well, the combining in which the idea of the Knee system incorporated in the normal linear combining is performed as in the case of the first embodiment. In other words, when the pixels are predicted not to be saturated in T1 and are saturated in T0, the linear combining using the value V1 of the short exposure pixel data in T1 and the linear combining using the value V0 of the standard exposure pixel data at T0 are performed according to the expression (1) shown above. In addition, when the pixels are predicted not to be saturated in T2 and are saturated in T1, the linear combining using the value V2 of the super-short exposure pixel data in T0, the value V1 of the short exposure pixel data in T1, and the value V0 of the standard exposure pixel data in T0 is performed according to the following expressions (4) and (5).

$$\begin{aligned}\text{"Predicted Value at } T1\text{"} &= K2 \times V2 \\ &= K2 \times (V2 - V\max/K1 + V\max/K1) \\ &= K2 \times (V2 - V\max/K1) + V\max \\ &= K2 \times (V2 - THR2) + (\text{signal output in } T1)\end{aligned} \quad (4)$$

where the normalization coefficient K2=T1/T2.

From the expressions (1) and (4) shown above, the combined output in the case in which the pixels are saturated in T1 will be expressed by the expression (5) shown below.

$$\begin{aligned}\text{Combined Ouput} &= K1 \times (\text{predicted value in } T1) \\ &= K1 \times (K2(V2 - THR2) + (\text{signal output in } T1) - \\ &\quad THR1) + (\text{signal output in } T0) \\ &= K1 \times K2 \times (V2 - THR2) + K1 \times \\ &\quad ((\text{signal output in } T1) - (THR1)) + \\ &\quad (\text{signal output in } T0)\end{aligned} \quad (5)$$

On the basis of the description described above, the internal configuration of the HDR image generating unit 12*d* in the second embodiment will be described.

As shown in FIG. 14A, the HDR image generating unit 12*d* includes a short exposure combining unit 90 and the super-short exposure combining unit 91.

The short exposure combining unit 90 has a similar configuration to the configuration shown in FIG. 13 in the first embodiment, and is different only in that the result of addition supplied by the adder 82 (hereinafter, referred to as the high-intensity image data) is outputted to the super-short exposure combining unit 91. Therefore, detailed description will be omitted.

The super-short exposure combining unit 91 includes the subtracter 83, the multiplier 84 and the adder 85.

The subtracter 83 reads out the super-short exposure image data for combining from the frame memory 14 via the memory access adjuster 12*e*, subtracts the saturation prediction level (THR2) supplied via the transmitter/DSP operation control unit 12*a* from the system controller 2*a* from the respective super-short exposure image data (V2) which constitutes the super-short exposure image data or the saturation prediction level (THR2), and outputs the result of subtraction to the multiplier 84. In other words, since the super-short exposure pixel data is supplied in the case of the pixels predicted to be saturated in the short exposure time T1, the value of (V2−THR2) in the expression (5) is a value other than "0", and since the saturation prediction level (THR2) is supplied as V2 in the case of the pixel predicted not to be saturated in the short exposure time T1, the value of (V2−THR2) in the expression (5) becomes "0".

The multiplier 84 multiplies the normalization coefficients K1 and K2 supplied from the system controller 2a via the transmitter/DSP operation control unit 12a and the value of (V2−VHR2) supplied from the subtracter 83 (K1×K2×(V2−THR2)), and outputs the result of multiplication to the adder 85. At this time, since the value of (V2−THR2) becomes "0" as described above in the case of the pixels predicted not to be saturated in the short exposure time T1, the result obtained by multiplying the normalization coefficients K1 and K2 is also "0" (K1×K2×0=0).

The adder 85 adds the result of multiplication supplied from the multiplier 84 and the high-intensity pixel data (K1×(V1−THR1)+(signal output of T0)) corresponding to the result of multiplication which constitutes the high-intensity image data supplied from the short exposure combining unit 90, and outputs the result of addition as the combined output. The HDR image generating unit 12d stores the combined output in the frame memory 14 via the memory access adjuster 12e as the HDR image data.

Subsequently, the actual operation in the second embodiment will be described.

Here, In the second embodiment, the sampling time T2 in the nondestructive read-out is assumed to be ⅟₁₀ of the short exposure time T2 (T2=T1/10=T0/100), and the sampling time T1 is assumed to be ⅟₁₀ of the standard exposure time T0 (T1=T0/10).

When the image pickup device 1 is turned on and obtains information on the exposure time from the host system 2 and information on the start line number for the nondestructive read-out (super-short exposure time and short exposure time) through the video processing system 12, the drive control signal that specifies the start line number for the nondestructive read-out is transmitted to the image pickup processing system 10 by the transmitter/DSP operation control unit 12a. In addition, in the timing controller 12b, the drive signals (pixel clock, vertical synchronous signal 0, and horizontal synchronous signal) for driving the image pickup device 100 are outputted to the image pickup processing system 10 so that the pixel signals of the standard exposure time for the exposed area may be obtained.

Upon reception of the drive control signal, the image pickup processing system 10 generates a reset line selection signal synchronously with the vertical synchronous signal 0 and the horizontal synchronous signal and a read-out line control signal for the destructive read-out during the standard exposure time in the scanning line scanner 54. The image pickup processing system 10 also generates read-out line control signals (two types) for the nondestructive read-out during the super-short exposure time and the short exposure time on the basis of the start line number and the horizontal synchronous signal. In addition, the generated read-out control signals are supplied to the OR logic 54g, and generates the read-out line selection signals for the respective exposure times. Then, the generated reset line selection signal and read-out line selection signals (three types) are outputted to the drive pulse generator 52. The drive pulse generator 52 generates drive pulses on the basis of the reference timing signal from the reference timing generator 50 and the various selection signals from the scanning line scanner 54, and supplies these pulses to the sensor cell array 56.

The sensor cell array 56 performs the destructive read-out of the electric charges accumulated through the exposure for the standard exposure time from the respective pixel lines in the exposed area by scanning the normal scanning line L1, the high-velocity scanning line L2, and the high-velocity scanning line L3 on the basis of the drive pulses from the drive pulse generator 52 (the accumulated electric charges are reset after the read-out) and, independently of the destructive read-out operation, performs the nondestructive read-out of the electric charges accumulated by the exposure for the super-short exposure time and the short exposure time from the respective pixel lines in the exposed area (the accumulated electric charges are not reset after the read-out). Then the pixel signals before and after the reset configured from the electric charges read out by the scanning of the normal scanning line L1 are outputted to the differential amplifier 60 via CH1 and CH2 of the horizontal transfer unit 58, calculates the differential value therebetween in the differential amplifier 60 and outputs the calculated results to the first AFE 102. The pixel signals immediately after the reset are outputted to the second AFE 104 via CH2 of the horizontal transfer unit 58. On the other hand, the pixel signals including the electric charges read out by the scanning of the high-velocity scanning line L2 are outputted to the third AFE 106 via CH3 of the horizontal transfer unit 58, and the pixel signals including the electric charges read out by the scanning of the high-velocity scanning line L3 are outputted to the fourth AFE 108 via CH4 of the horizontal transfer unit 58.

The first AFE 102 generates the standard exposure pixel data acquired by converting the pixel signals (analogue data) for the exposure during the standard exposure time outputted in sequence through the differential amplifier 60 into the digital data, and outputs the same to the video processing system 12. On the other hand, the second AFE 104 generates the reference pixel data acquired by converting the pixel signals (analogue data) immediately after the reset outputted in sequence via CH2 into the digital data, and outputs the same to the video processing system 12. The fourth AFE 108 generates the super-short exposure pixel data obtained by converting the pixel signals (analogue data) for the exposure during the super-short exposure time into the digital data and outputs the same to the video processing system 12, and the third AFE 106 generates the short exposure pixel data acquired by converting the pixel signals (analogue data) for the exposure during the short exposure time into the digital data and outputs the same to the video processing system 12.

The video processing system 12 inputs the standard exposure image data outputted from the first AFE 102 to the HDR image generating unit 12d, and inputs the reference image data outputted from the second AFE 104, the short exposure image data outputted from the third AFE 106, and the super-short exposure image data outputted from the fourth AFE 108 to the non-standard image data generating unit/saturation prediction unit 12c.

When the reference image data is supplied from the image pickup processing system 10 and the address information is supplied from the timing controller 12b, the non-standard image data generating unit/saturation prediction unit 12c stores the reference image data in the frame memory 14 via the memory access adjuster 12e on the basis of the address information.

When the super-short exposure image data is supplied continuously from the image pickup processing system 10, the non-standard image data generating unit/saturation prediction unit 12c subtracts the pixel value of the reference pixel data at the same pixel position as the super-short exposure pixel data, which is stored in the frame memory 14 from the pixel values of the respective super-short exposure pixel data which constitutes the super-short exposure image data by the subtracter 75a of the second non-standard image generating unit 75 to generate the super-short exposure pixel data for combining having the fixed pattern noise eliminated therefrom. When the super-short exposure image data (line unit) is generated, the second non-standard image generating unit 75 outputs the corresponding super-short exposure image data respectively to the second saturation prediction unit 76 and the second combined image generating unit 77.

When the short exposure image data is supplied following the super-short exposure image data from the image pickup processing system 10, the subtracter 70a of the first non-standard image generating unit 70 subtracts the pixel value of the reference pixel data at the same pixel position as the short exposure pixel data stored in the frame memory 14 from the pixel value in the respective short exposure pixel data which constitutes the short exposure image data, and generates the short exposure image data for combining having the fixed pattern noise eliminated therefrom. When the short exposure image data (line unit) is generated, the first non-standard image generating unit 70 outputs the short exposure image data respectively to the first saturation prediction unit 72 and the first combined image generating unit 73. The operations of the first saturation prediction unit 72 and the first combined image generating unit 73 are the same as in the first embodiment, the description will be omitted.

When the super-short exposure image data is supplied from the second non-standard image generating unit 75 and the saturation prediction level THR2 is supplied from the transmitter/DSP operation control unit 12a, the second saturation prediction unit 76 compares the luminance values V2 indicated by the respective super-short exposure pixel data which constitute the super-short exposure image data and THR2 by the comparator 76a. As described above, since the super-short exposure time T2 is determined to be ¹⁄₁₀ of the short exposure time T1, as shown in FIG. 12, the signal output level of the pixel irradiated at S1 described above is predicted to be Vmax/10 at T2. Therefore, here, the normalization coefficient K2 is determined to 10, and the value of THR2 is determined to be "Vmax/10". Therefore, when "V2>Vmax/10" is satisfied, the comparator 76a predicts that the target pixel will be saturated in the short exposure time and outputs "1" as the saturation prediction result. On the other hand, when "V2≦Vmax/10" is satisfied, the comparator 76a predicts that the target pixel is not saturated during the short exposure time and outputs the value "0" as the saturation prediction result. The second saturation prediction unit 76 outputs the saturation prediction result to the second combined image generating unit 77, and outputs the saturation prediction result to the saturation prediction result storage memory 74.

In this manner, since the prediction (determination) of the saturation/desaturation is performed on the basis of the super-short exposure pixel data, and the super-short exposure pixel data includes the differential value for combining with respect to the reference pixel data, the prediction (determination) of the saturation/desaturation may be performed on the basis of the pixel data whose noise level to be mixed is low. Therefore, the saturation/desaturation may be predicted (determined) with high degree of accuracy.

When the short exposure image data is supplied from the second non-standard image generating unit 75 and the saturation prediction result is supplied from the second saturation prediction unit 76, the second combined image generating unit 77 selects and outputs the super-short exposure pixel data (V2) when the saturation prediction result is "1", and the saturation prediction level THR2 supplied from the system controller 2a through the transmitter/DSP operation control unit 12a when the saturation prediction result is "0" for the respective super-short exposure pixel data by a selection output unit 77a. The selection output is stored in the frame memory 14 via the memory access adjustor 12e as the super-short exposure pixel data for combining.

On the other hand, when the super-short exposure image data and the short exposure image data are generated and the standard exposure image data is supplied from the image pickup processing system 10 in the non-standard image data generating unit/saturation prediction unit 12c, the HDR image generating unit 12d generates the HDR image data by the linear combining which is a combination of the normal linear combining and the Knee system.

The HDR image generating unit 12d performs the processing according to the expression (1) using the subtracter 80, the multiplier 81, and the adder 82 of the short exposure combining unit 90, and generates the high-intensity image data.

Here, since the luminance value of the short exposure pixel data (after differential processing)=V1, K1=10, THR1=Vmax/10, and the value of the standard exposure pixel data (signal output in T0)=V0≈Vmax are satisfied, the expression (1) will be the expression (2) as in the first embodiment.

Since the operations of the subtracter 80, the multiplier 81, and the adder 82 of the short exposure combining unit 90 are the same as the subtracter 80, the multiplier 81, and the adder 82 of the first embodiment, and their explanations are omitted. However, the result of addition supplied from the adder 82 (high-intensity image data (10×(V1−Vmax/10)+V0) or the standard exposure image data (V0)) is outputted to the super-short exposure combining unit 91.

The operation of the super-short exposure combining unit 91 will be described below.

Here, the luminance value (after differential processing) of the super-short exposure image data is V2, the normalization coefficient is K2=10, and the saturation prediction level is THR2=Vmax/10 are satisfied, the expression (5) will be the following expression (6):

$$\text{Combined output}=10\times10\times(V2-V\text{max}/10)+10\times(V1-V\text{max}/10)+V0 \qquad (6)$$

The HDR image generating unit 12d reads out the super-short exposure image data for combining from the frame memory 14 via the memory access adjuster 12e, inputs the read-out data to the subtracter 83, and inputs the saturation prediction level THR2 supplied from the system controller 2a via the transmitter/DSP operation control unit 12a to the subtracter 83. Subsequently, the subtracter 83 subtracts the value THR2(Vmax/10) from the luminance value V2 or THR2 (Vmax/10) indicated by the respective super-short exposure pixel data which constitutes the supplied super-short exposure image data, and the result of subtraction is outputted to the multiplier 84. In other words, in the case of the pixels which are saturated during the short exposure time T1, the differential value "V2−Vmax/10" between V2 and THR2 are outputted, and in the case of the pixels which are not saturated during the short exposure time T1, the value "0" is outputted.

The multiplier 84 multiplies the normalization coefficient K1(10) and K2(10) supplied from the system controller 2a through the transmitter/DSP operation control unit 12a and the result of subtraction supplied from the subtracter 83, and the result of multiplication "10×10×(V2−Vmax/10)" or "0" are outputted to the adder 85.

The adder 85 adds the luminance value (10×(V1−Vmax/10)+V0) indicated by the high-intensity pixel data which constitutes the high-intensity image data supplied from the short exposure combining unit 90 and the result of multiplication supplied from the multiplier 81, and outputs any one of the results of addition "10×10×(V2−Vmax/10)+10×(V1−Vmax/10)+V0", "10×(V1−Vmax/10)+V0", and "V0" as the HDR combined output. In other words, for the pixels predicted to be saturated in the short exposure time T1, "10×10× (V2−Vmax/10)+10×(V1−Vmax/10)+V0" obtained by normalizing the super-short exposure pixel data is outputted as the HDR pixel data. For the pixels predicted to be saturated in the standard exposure time T0, "10×(V1−Vmax/10)+V0" obtained by normalizing the short exposure pixel data is outputted as the HDR pixel data. For the pixels predicted not to be saturated in the standard exposure time T0, the standard exposure pixel data "V0" itself is outputted as the HDR pixel data. In other words, the HDR image data is a combination of the pixel data selected on the basis of the prediction result in which the saturation/desaturation are predicted with high degree of accuracy as described above and obtained by normalizing the super-short exposure image data, the pixel data acquired by normalizing the short exposure pixel data, and the standard exposure pixel data "V0". The HDR image data is stored in the frame memory 14 via the memory access adjuster 12e.

In the case of the ideal sensor (having no characteristic variations from pixel to pixel, and the noise "0"), the pixels predicted to be saturated in the short exposure time T1 is V1=Vmax, and V0=Vmax, and "10×10×(V2−Vmax/10)+ 10×(Vmax−Vmax/10)+Vmax"="100×V2" is outputted. For the pixels predicted to be saturated in the short exposure time T0, the output V2 is cancelled, that is, V1=Vmax, V0=Vmax, and "10×(Vmax−Vmax/10)+Vmax"="10×V1" is outputted. On the other hand, the normal sensor has characteristic variations from pixel to pixel and noise, but the final signal level is determined from the three pixel signal values. Therefore, the noise reduction effect is obtained by integral effect. The HDR image generation according to the embodiments of the invention (the dynamic enlargement in which the linear property is maintained) amplifies the differential value of the signals without amplifying the pixel signal directly, and hence the deterioration of the image quality due to the erroneous determination is reduced.

As described above, since the image pickup system 3 in the second embodiment is capable of predicting whether or not the pixels corresponding to the super-short exposure image data and the short exposure image data are saturated during the standard exposure time on the basis of these image data, the saturation/desaturation is predicted (determined) from the pixel data which is affected little by noise with high degree of accuracy. Since the pixel data used for generating the HDR image data may be selected from among the standard exposure pixel data, the short exposure pixel data, and the super-short exposure pixel data on the basis of this prediction result, the standard exposure pixel data which are not saturated in the standard exposure time is selected accurately, whereby the HDR image data in which the image quality is stabilized (with extremely small possibility of erroneous selection) is generated.

Since the image pickup system 3 is capable of combining the short exposure pixel data in the case of saturating in T0 using the standard exposure pixel data and the short exposure pixel data through the method which is a combination of the normal linear combining and the Knee system, and is capable of combining the super-short exposure pixel data in the case of saturating in T1 using the standard exposure pixel data, the short exposure pixel data, and the super-short exposure pixel data, the noise component included in the short exposure pixel data (HDR pixel data) and the super-short exposure pixel data (HDR pixel data) for combining is reduced in comparison with the normal linear combining.

In the second embodiment, the sensor cell array 56 corresponds to the photoelectric transfer unit in any one of Modes 1, 2, 12 and 13, the destructive read-out process of the electric charges in the standard exposure time from the exposed area of the sensor cell array 56 by the reference timing generator 50, the scanning line scanner 54, the drive pulse generator 52, and the horizontal transfer unit 58 in the nondestructive scanning compatible image pickup device 100 of the image pickup processing system 10 corresponds to first reader in any one of Modes 1, 2, 3, 6 and 12 or the first reading step according to Mode 13, and nondestructive read-out process of the electric charges in the super-short exposure time and the short exposure time from the exposed area of the sensor cell array 56 by the reference timing generator 50, the scanning line scanner 54, the drive pulse generator 52, and the horizontal transfer unit 58 in the nondestructive scanning compatible image pickup device 100 of the image pickup processing system 10 corresponds to the second reader according to any one of Modes 1 to 6 and 12, or the second reading step in Mode 13.

In the second embodiment, predicting the saturation/desaturation in the non-standard image data generating unit/saturation prediction unit 12c corresponds to the saturation predictor according to any one of Modes 1, 2, 3, 4, 6 and 12, or a saturation predicting step according to Mode 13, and the HDR image generating unit 12d corresponds to a HDR image data generator according to any one of Modes 2, 4, 6, 9, 10 and 12 or a HDR image data generating step according to Mode 13.

In the first embodiment, an example in which only the short exposure pixel data is acquired as the non-standard exposure pixel data has been described. However, the invention is not limited thereto, and a configuration in which the super-short exposure pixel data is acquired instead of the short exposure pixel data to predict the saturation/desaturation on the basis of the super-short exposure pixel data (V2) may also be applicable. In this case, the ratio between T0 and T2 is, for example, 100:1, and the normalization coefficient K2 for T2 is 100. Therefore, the expression (2) shown above will be the following expression (3):

$$\text{Combined Output} = 10 \times (V2 - V\text{max}/100) + V0 \qquad (3)$$

In other words, when the pixels are predicted to be saturated in the normal exposure time, the combined output (HDR pixel data) is generated from the super-short exposure pixel data (V2) and the standard exposure pixel data (V0).

It is also possible to acquire the super-short exposure pixel data in addition to the short exposure pixel data, and predict the saturation/desaturation on the basis of the acquired data. In this case, whether or not the amount of irradiation per unit time in the super-short exposure time T2 exceeds the amount of irradiation S1 which reaches Vmax at the time point of the short exposure time T1 is predicted and, when it exceeds, the corresponding pixels are determined to be saturated in the standard exposure time T0, and the combined output (HDR pixel data) is generated using the super-short exposure pixel data and the standard exposure pixel data. Accordingly, even in a case in which the pixels are saturated at the time point of T1, the HDR image data in which the image quality is stabilized may be generated by linearly combining the pixel data at the time point of T2 of desaturation using the linear combining method in which the Knee system described above is applied.

In the second embodiment shown above, the image pickup system 3 includes the image pickup apparatus 1 and the host system 2. However, the invention is not limited thereto, and other configurations such as a configuration in which all the function of the host system 2 are provided to the image pickup device 1, a configuration in which the function of the video processing system of the image pickup apparatus 1 is provided to the host system 2, and a configuration in which the respective components of the image pickup apparatus 1 are separated and the respective components are connected, for example, via the network may also be applicable. For example, a configuration in which the image pickup processing system and the video processing system are separated and connected via the network to pick up image of a remote location and process the same is also conceivable.

The entire disclosure of Japanese Patent Application Nos: 2006-132106, filed May 11, 2006 and 2007-098182, filed Apr. 4, 2007 are expressly incorporated by reference herein.

What is claimed is:

1. An image pickup apparatus having a photoelectric conversion unit having a plurality of pixels, including photoelectric conversion elements, arranged in a matrix pattern for converting exposed light into electric charges and accumulating the same and an electronic shutter function for controlling the exposure time for each frame, the image pickup device comprising:

a first reader that generates standard exposure pixel data by reading out electric charges exposed during a standard exposure time from respective pixels in an exposed area of the photoelectric conversion unit in a destructive read-out method;

a second reader that generates non-standard exposure pixel data by reading out electric charges exposed during a short exposure time from the respective pixels in a non-destructive read-out method, wherein the short exposure time begins at a same instant as the standard exposure time and is shorter than the standard exposure time;

a saturation predictor that predicts whether or not amounts of accumulated electric charges in the respective pixels will be saturated based on the non-standard exposure pixel data and a saturation prediction level;

an HDR (High Dynamic Range) image data generator that generates HDR image data by combining the standard exposure pixel data and the non-standard exposure pixel data based on a prediction result of the saturation predictor, wherein when the prediction result indicates that the amounts of accumulated electric charges in the respective pixels will be saturated, the HDR image data generator:

generates subtraction data by subtracting the saturation prediction level from the non-standard exposure pixel data;

generates multiplication data by multiplying the subtraction data by a normalization coefficient, wherein the normalization coefficient is equal to the standard exposure time divided by the short exposure time; and generates the HDR image data by adding the standard exposure pixel data to the multiplication data.

2. An image pickup method used in the image pickup apparatus having a photoelectric conversion unit having a plurality of pixels, including photoelectric conversion elements, arranged in a matrix pattern for converting exposed light into electric charges and accumulating the same and an electronic shutter function for controlling the exposure time for each frame, the method comprising:

a first reading step for generating standard exposure pixel data by reading out electric charges exposed during a standard exposure time from respective pixels in an exposed area of the photoelectric conversion unit in a destructive read-out method;

a second reading step for generating non-standard exposure pixel data by reading out electric charges exposed during a short exposure time, from the respective pixels in a nondestructive read-out method, wherein the short exposure time begins at a same instant as the standard exposure time and is shorter than the standard exposure time;

a saturation predicting step for predicting whether or not amounts of accumulated electric charges in the respective pixels will be saturated based on the non-standard exposure pixel data and a saturation prediction level; and an HDR (High Dynamic Range) image data generating step for generating HDR image data by combining the standard exposure pixel data and the non-standard exposure pixel data based on a prediction result from the saturation predicting step, wherein when the prediction result indicates that the amounts of accumulated electric charges in the respective pixels will be saturated, the HDR image data generating step includes:

generating subtraction data by subtracting the saturation prediction level from the non-standard exposure pixel data;

generating multiplication data by multiplyinq the subtraction data by a normalization coefficient, wherein the normalization coefficient is equal to the standard exposure time divided by the short exposure time; and generating the HDR image data by adding the standard exposure pixel data to the multiplication data.

* * * * *